United States Patent [19]

Takeshita et al.

[11] Patent Number: 5,416,756
[45] Date of Patent: May 16, 1995

[54] LENS ACTUATING SYSTEM WITH IMPROVED FREQUENCY RESPONSE FOR OPTICAL DISK DRIVE

[75] Inventors: Nobuo Takeshita; Hideaki Kobachi; Mitsuru Irie; Morihiro Karaki, all of Nagaokakyo, Japan

[73] Assignee: Mitsubishi Denki Kabushiki Kaisha, Kyoto, Japan

[21] Appl. No.: 971,233

[22] Filed: Nov. 4, 1992

[30] Foreign Application Priority Data

Nov. 7, 1991 [JP] Japan ................................. 3-291504
Feb. 12, 1992 [JP] Japan ................................. 4-025153
Feb. 28, 1992 [JP] Japan ................................. 4-043170

[51] Int. Cl.$^6$ ................................................ G11B 7/00
[52] U.S. Cl. ........................................ 369/32; 369/44.14; 369/44.28; 369/44.35
[58] Field of Search ............. 369/44.11, 44.35, 44.14, 369/44.15–44.22, 44.28, 112, 44.36, 124, 44.27, 44.37, 44.29, 44.32, 32, 247, 248, 251

[56] References Cited

U.S. PATENT DOCUMENTS

| | | | |
|---|---|---|---|
| Re. 33,548 | 3/1991 | Kime | 369/44.21 |
| 4,032,776 | 6/1977 | van Rosmalen | 369/44.15 |
| 4,387,452 | 6/1983 | Bricot et al. | 369/32 |
| 4,425,043 | 1/1984 | van Rosmalen | 369/44.14 |
| 4,641,020 | 2/1987 | Iwai | 369/44.14 |
| 4,759,005 | 7/1988 | Kasahara | 369/44.16 |
| 4,767,187 | 8/1988 | Gijzen et al. | 369/44.15 |
| 4,769,803 | 9/1988 | Yamamiya | 369/44.16 |
| 4,792,935 | 11/1988 | Kime et al. | 369/44.22 |
| 4,796,248 | 1/1989 | Ozaki et al. | 369/44.21 |
| 4,838,649 | 6/1989 | Ichikawa et al. | 369/44.21 |
| 4,907,098 | 3/1990 | Ohkoda et al. | 369/247 |
| 4,956,833 | 9/1990 | Kokado et al. | 369/44.15 |
| 5,001,694 | 3/1991 | Lee et al. | 369/44.16 |
| 5,018,124 | 5/1991 | Ogasawara et al. | 369/112 |
| 5,078,471 | 1/1992 | Takishima | 369/44.16 |
| 5,090,001 | 2/1992 | Ito et al. | 369/32 |
| 5,103,438 | 4/1992 | Masunaga et al. | 369/44.22 |
| 5,111,339 | 5/1992 | Hagiwara | 369/44.22 |
| 5,132,850 | 7/1992 | Hagiwara | 369/44.22 |
| 5,164,936 | 11/1992 | Kagami | 369/247 |
| 5,168,486 | 12/1992 | Yanagawa | 369/44.14 |
| 5,182,738 | 1/1993 | Yoshikawa | 369/44.21 |
| 5,195,074 | 3/1993 | Tanoshima et al. | 369/44.11 |
| 5,218,597 | 6/1993 | Yabe | 369/44.24 |

FOREIGN PATENT DOCUMENTS 58-137142  8/1983  Japan .

OTHER PUBLICATIONS

International Symposium on Optical Memory 1991, Oct. 1–4, 1991, Sapporo, Japan, Technical Digest.

*Primary Examiner*—Georgia Y. Epps
*Assistant Examiner*—Nabil Hindi

[57] ABSTRACT

A lens actuating system for an optical disk drive has an objective lens movably mounted in a movable frame with orthogonal X-, Y-, and Z-axes. A seeking servo moves the frame in the X-direction. A tracking servo moves the objective lens in the X-direction. A focusing servo moves the objective lens in the Z-direction. An optoelectronic sensor detects the relative position of the objective lens and frame in the X-direction, so that the tracking servo can maintain a fixed relative position during track-seeking, or in the Z-direction, to establish a neutral point on the Z-axis for the focusing servo. Force applied by the focusing servo or tracking servo to move the objective lens in one direction can be opposed by an equal and opposite force applied to a driven mass, so that a net zero force is transmitted to the frame.

12 Claims, 27 Drawing Sheets

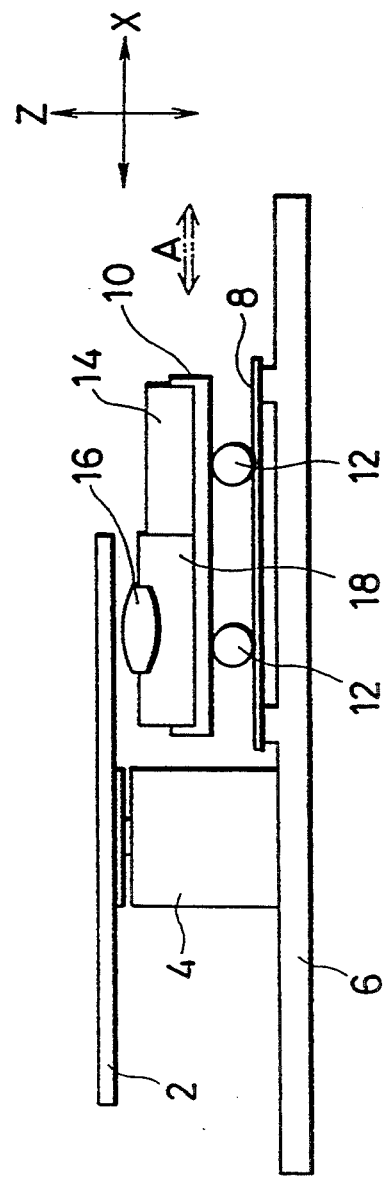

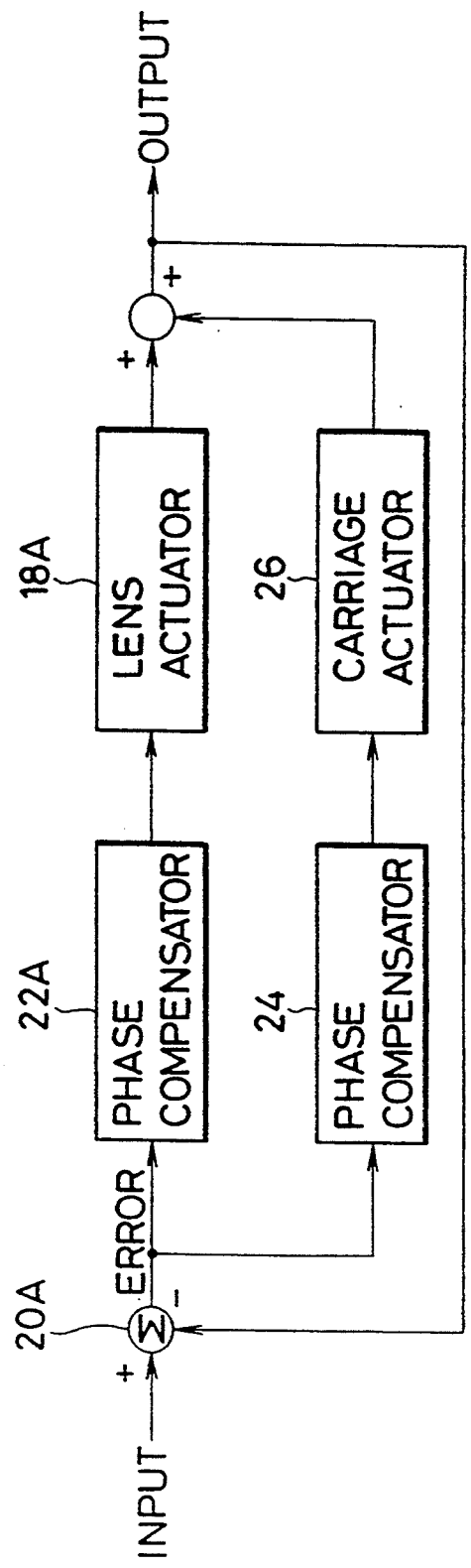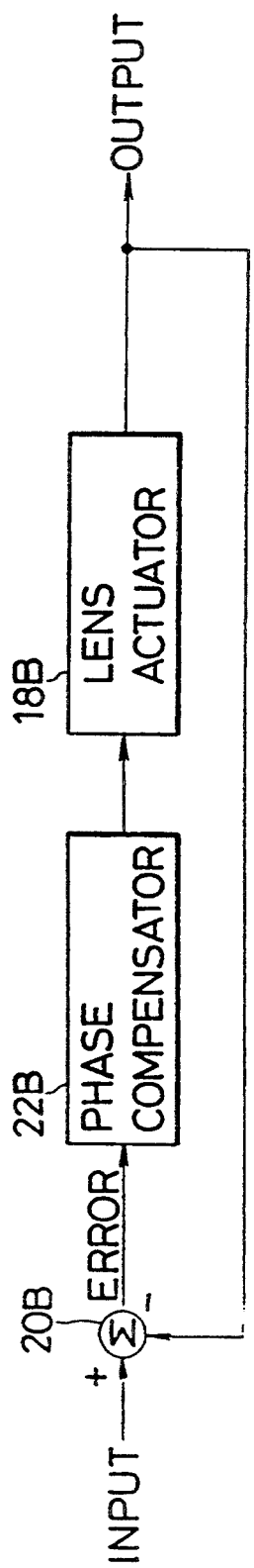

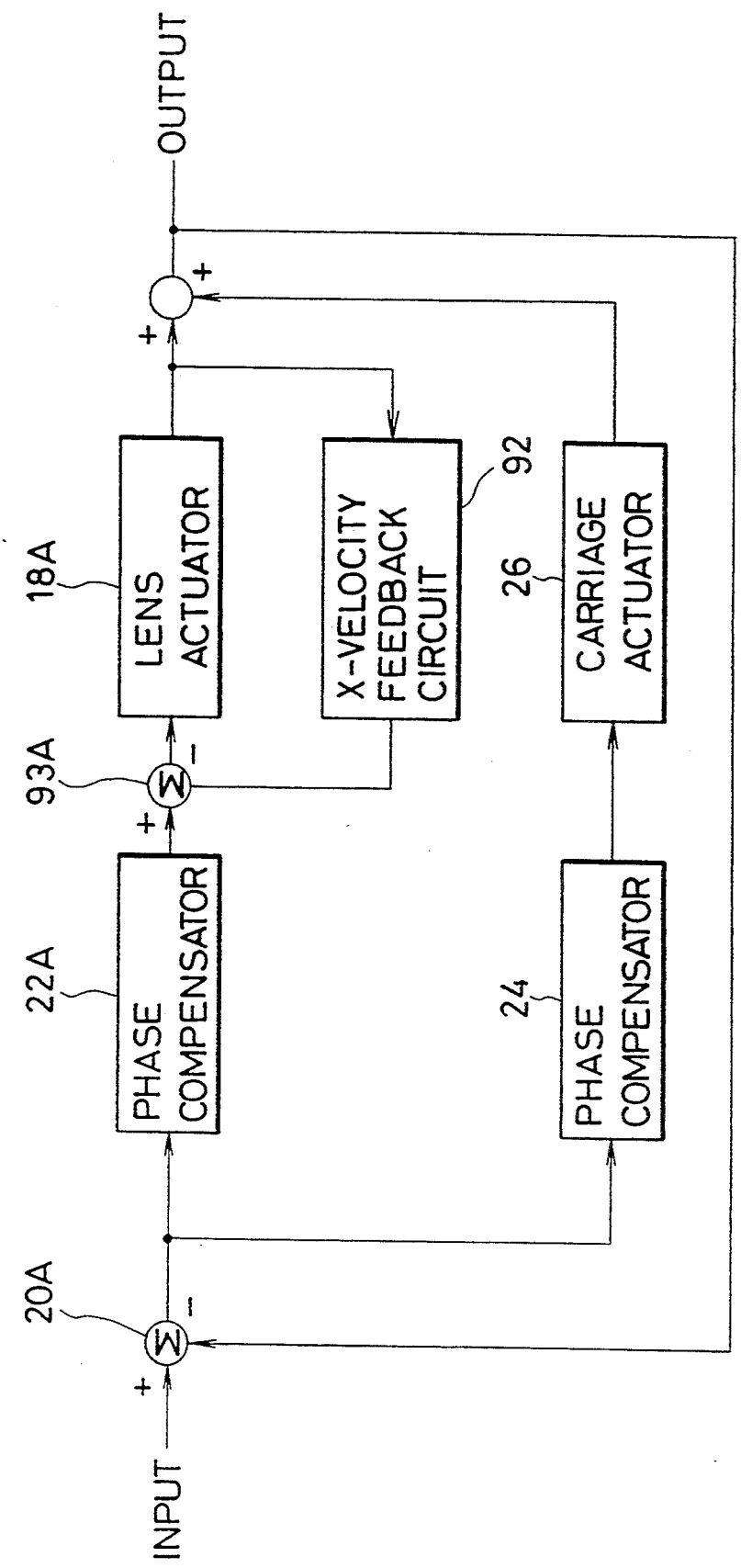

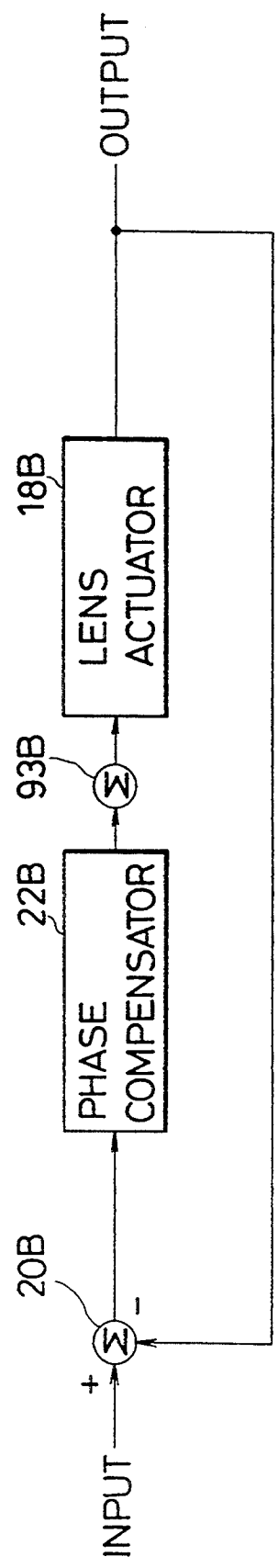

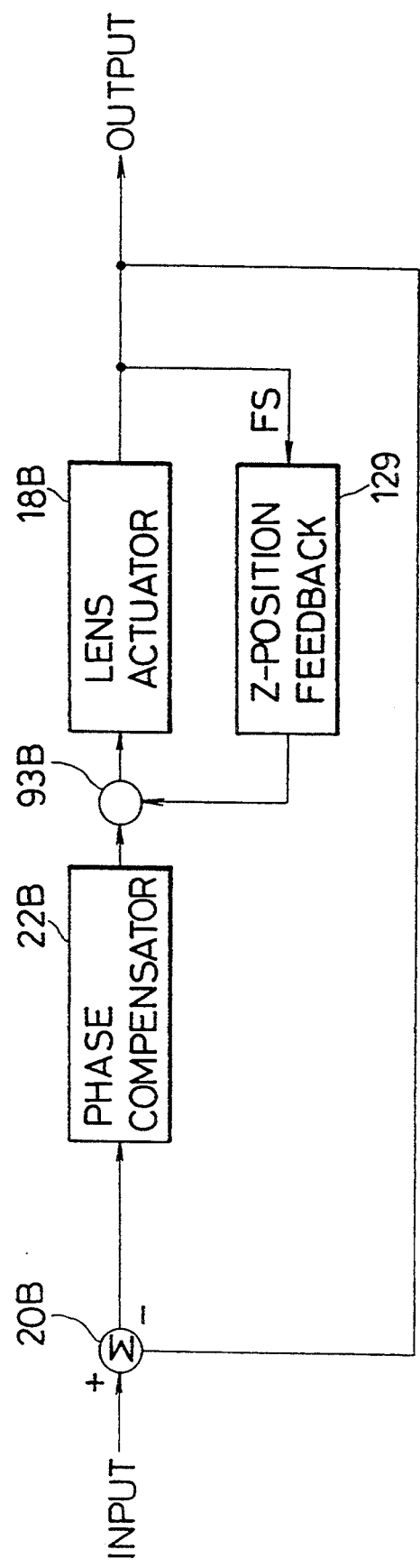

LENS ACTUATING SYSTEM WITH IMPROVED FREQUENCY RESPONSE FOR OPTICAL DISK DRIVE

BACKGROUND OF THE INVENTION

This invention relates to the lens actuating system of an optical disk drive, and more particularly, to improvements in the lens actuating system that enhances its frequency response characteristics.

An optical disk drive reads or writes information on concentric or spiral tracks on an optical disk by directing a light beam through an objective lens that is movably supported in a movable frame. A focusing servo moves the lens relative to the frame in a direction perpendicular to the surface of the disc, to focus the light beam to a spot on the disk. A seeking servo moves the frame parallel to the surface of the disk in a direction perpendicular to the tracks, to bring the spot to a desired track. A tracking servo moves the lens in the same direction relative to the frame, to keep the spot centered on the desired track as the disk rotates.

These serves conventionally operate by using light reflected from the disk to detect the position of the lens relative to the disk surface, but reliance on that scheme alone has certain inherent disadvantages. With regard to motion parallel to the disk surface, there is mutual interference between the seeking and tracking servos. For example, unwanted motion generated by the tracking servo can delay the seeking of the desired track. Disabling the tracking servo during seeking is not a satisfactory solution, because the tracking servo cannot hold the lens still relative to the frame and the lens tends to drift in response to random external disturbances.

Similarly, since the focusing servo does not know the position of the lens relative to the frame, the lens assembly must be attached to the frame by flexible supports or dampers that hold the lens in a fixed neutral position when the focusing servo is inactive. Such supports or dampers are difficult to position accurately during the manufacturing process, however, and have unwanted vibrational modes that can disrupt focusing and tracking control.

The above problems show up as disturbances in the frequency response characteristics of the servo control systems. Additional disturbances in these frequency characteristics have been found to arise from improper balance of the lens assembly, resonant vibration of the disk excited by movement of the lens, and competition between the tracking and seeking servos for control of the lens when the gain curves of these two servos intersect at more than one point. All these disturbances destabilize servo control and degrade the tracking, seeking, and focusing performance of the optical disk drive.

SUMMARY OF THE INVENTION

It is accordingly an object of the present invention to reduce irregularities in the gain-frequency and phase-frequency characteristics of the tracking servo of an optical disk drive.

Another object of the invention is to reduce irregularities in the gain-frequency and phase-frequency characteristics of the focusing servo of an optical disk drive.

Yet another object of the invention is to prevent interference between the tracking servo and seeking servo of an optical disk drive.

Still another object of the invention is to simplify the manufacture and adjustment of the lens actuating system of an optical disk drive.

Yet another object of the invention is to prevent the lens assembly of an optical disk drive from being tilted by centrifugal force.

Still another object of the invention is to prevent servo control of the lens from exciting resonant vibration of the optical disk.

The invented lens actuating system moves an objective lens with respect to concentric circular or spiral tracks on an optical disk. The motion can be described with reference to three orthogonal axes: an X-axis parallel to the surface of the disk and perpendicular to the tracks; a Y axis parallel to the sub-face of the disk and perpendicular to the X-axis; and a Z-axis perpendicular to the surface of the disk.

The objective lens is rigidly mounted in a lens assembly which is movably mounted in a movable frame. A seeking servo moves the frame and lens assembly as a single unit parallel to the X-axis. A tracking servo moves the objective lens parallel to the X-axis by moving the lens assembly relative to the frame. A focusing servo moves the objective lens parallel to the Z-axis by moving the lens assembly relative to the frame.

According to a first aspect of the invention, an optoelectronic sensor senses the position of the objective lens relative to the frame on the X-axis. The resulting positional information is fed back to the tracking servo and used to hold the objective lens and frame in a fixed relative position on the X-axis when the seeking servo moves the frame and lens assembly parallel to the X-axis.

According to a second aspect of the invention, the optoelectronic sensor also senses the position of the objective lens relative to the frame on the Z-axis. The resulting positional information is fed back to the focusing servo and is used to establish a neutral position of the lens assembly on the Z-axis.

According to a third aspect of the invention, the tracking servo operates by rotating the lens assembly in a limited range around the Z-axis, which is considered to move together with the frame. The lens assembly itself has a short axis substantially coincident with the X-axis and a long axis substantially coincident with the Y-axis. The objective lens is mounted near one end of the long axis. A counterweight is mounted near the other end of the long axis. The counterweight balances the lens so that the center of mass of the entire lens assembly is disposed on the Z-axis. The counterweight is furthermore disposed so that, if the lens assembly is divided into two halves by a plane containing its short axis and the Z-axis, the centers of mass of both halves are disposed in a single plane perpendicular to the Z-axis.

According to a fourth aspect of the invention, the lens actuating system comprises a first actuator for moving the lens assembly relative to the frame, a driven mass, and a second actuator for moving the driven mass relative to the frame. The first actuator and second actuator generate equal forces in opposite directions so that they transmit zero net force to the frame. The first actuator may operate as part of the focusing servo, or as part of the tracking servo, or as part of both the focusing servo and tracking servo.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 illustrates the general structure of an optical disk drive.

FIG. 2A is a general block diagram of the tracking and seeking servo system.

FIG. 2B is a general block diagram of the focusing servo system.

FIG. 12A is a block diagram of the tracking servo and seeking servo of this novel lens actuating system.

FIG. 12B is a block diagram of the focusing servo of this novel lens actuating system.

FIG. 24A and FIG. 24B are block diagrams illustrating servo feedback loops in the lens actuating system in FIG. 16.

DETAILED DESCRIPTION OF THE INVENTION

Figure 3:
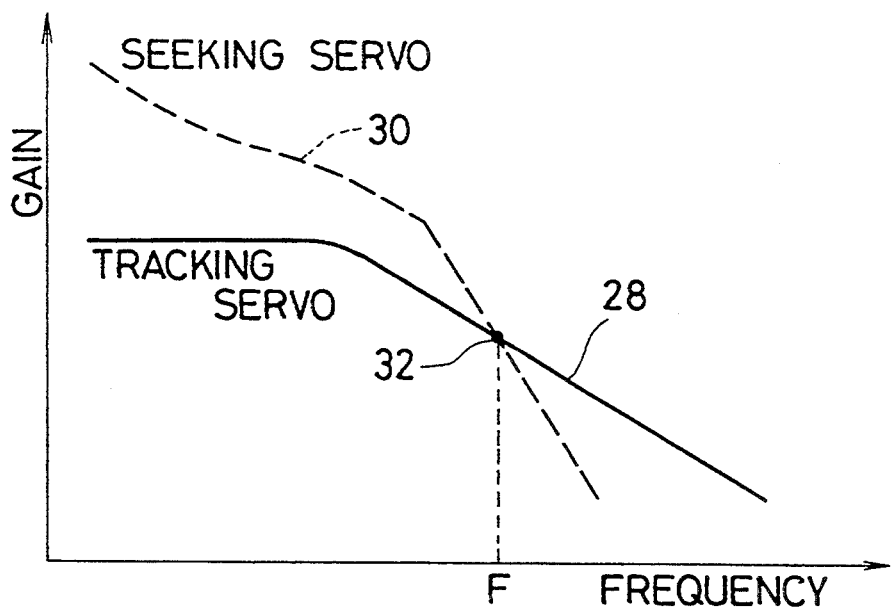
FIG. 3 is a graph illustrating desired gain-frequency characteristics of the tracking servo and seeking servo.

With reference to the attached drawings, first a general description of an optical disk drive and its lens actuating system will be given, then several preferred embodiments of the invention will be described. Identical or equivalent elements appearing in different drawings will be identified by the same reference numerals and will be described in detail only once. The X, Y, and Z axes will be identified by arrows in all applicable drawings. The drawings illustrate the invention but do not restrict its scope, which should be determined solely from the appended claims.

Referring to FIG. 1, an optical disk drive comprises an optical disk 2 which is rotationally driven by a spindle motor 4 mounted on a base 6. A rail 8 is also mounted on the base 6 on the side facing the optical disk 2. A carriage 10 is supported on this roll 8 by bearings 12 which permit it to move in the X-direction, perpendicular to concentric or spiral tracks (hoe shown) on the optical disk 2, as indicated by the arrow A. An optical unit 14 mounted on the carriage 10 generates a collimated light beam (not shown in the drawing) which is focused by an objective lens 16 onto a spot on the optical disk 2. The objective lens 16 is supported by a lens actuator 18, also mounted on the carriage 10, that moves the objective lens 16 in the X- and Z-directions. To this end, the lens actuator 18 comprises an X-direction lens actuator 18A for moving the objective tens 16 in the X-direction, and a Z-direction lens actuator 18B for moving the objective lens 16 in the Z-direction.

Motion of the carriage 10 and objective lens 16 in the X-direction is controlled by servo systems shown in a general block diagram in FIG. 2A. The input is a command indicating the desired position of the objective lens in the X-direction, normally a position such that the light beam is focused on the center of a certain track. The output is the actual position of the objective lens in relation to the optical disk, as sensed from light reflected from the disk surface. Information giving the sensed position is fed back to an error-detecting device 20A which compares the output with the input and produces an error signal. The error signal is red through a pair of phase compensators 22A and 24 to the X-direction lens actuator 18A and a carriage actuator 26. The outputs of the X-direction lens actuator 18A and the carriage activator 26 (the motions of the objective lens in the X-direction and of the carriage in the X-direction) are summed to produce the system output, which is the position of the objective lens.

Motion of the objective lens 16 in the Z-direction is controlled by servo systems shown in a general block diagram in FIG. 2B. The input is a command indicating the desired position of the objective lens in the Z-direction. The output is the actual position of the objective lens in relation to the optical disk, as sensed from light reflected from the disk surface. Information giving the sensed position is fed back to an error-detecting device 20B which compares the output with the input and produces an error signal. The error signal is fed through a phase compensator 22B to the Z-direction lens actuator 18B.

There are thus three servo systems: a focusing servo comprising the error-detecting device 20B, the phase compensator 22B, and the Z-direction lens actuator 18B; a tracking servo comprising the error-detecting device 20A, the phase compensator 22A, and the X-direction lens actuator 18A in the X-direction; and a seeking servo comprising the error-detecting device 20A, the phase compensator 24, and the carriage actuator 26. A more detailed block diagram of these servo systems will be given later, showing novel feedback loops not indicated in FIG. 2A and FIG. 2B.

The present invention concerns these novel feedback loops and the structure of the lens actuator 18. Details of the cartage 10 and optical unit 14 in FIG. 1 and of the error-detecting devices 20A and 20B, phase compensators 22A, 22B and 24, and carriage actuator 26 in FIG. 2A and FIG. 2B will accordingly be omitted. Suffice it to say that the optical unit 14 comprises a semiconductor laser diode and other well-known components, the error-detecting devices 20A and 20B are termed of an electronic device such as a microprocessor, and the carriage actuator 26 is a linear motor such as a voice-coil motor.

The seeking servo and tracking servo, which both execute motion in the X-direction, work together and complement each other. The lens actuator 18 has a limited range of motion in the X-direction, but its small mass enables it to move quickly with rapid acceleration or deceleration. The carriage 10 has a much greater range of motion in the X-direction, but its comparatively large mass entails slower velocity and acceleration. Accordingly, the lens actuator 18 generally performs low-amplitude, high-frequency movement while the carriage 10 performs high-amplitude, low-frequency movement.

FIG. 3 illustrates the desired frequency response of the tracking and seeking servos, showing frequency on the horizontal axis and gain on the vertical axis. The solid curve 28 indicates the frequency response of the tracking servo; the dashed curve 30 indicates the frequency response of the seeking servo. At high frequencies the tracking servo has higher gain; at low frequencies the carriage servo has higher gain. The two curves 28 and 30 therefore intersect at a crossover point 32, the frequency F of which is referred to as a crossover frequency.

Figure 4:
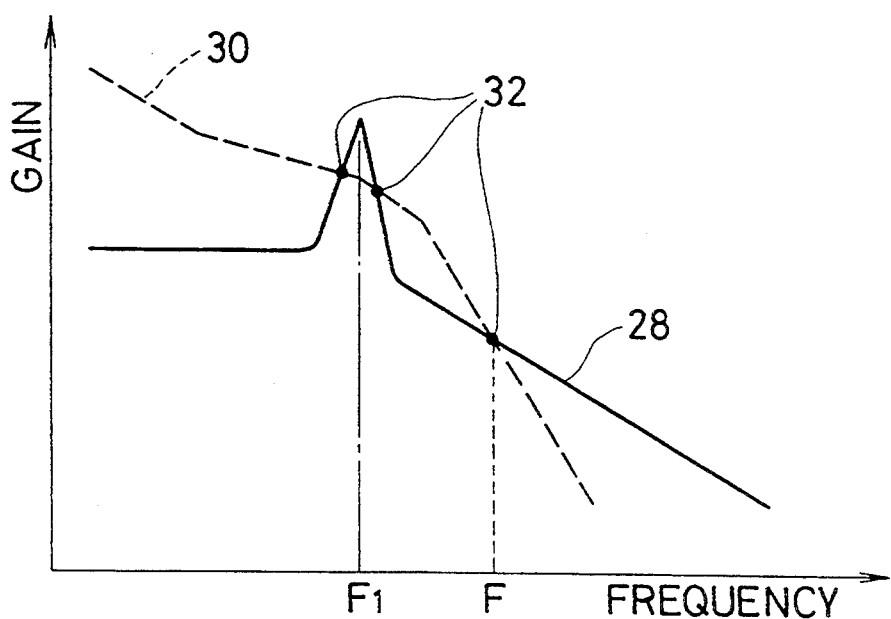
FIG. 4 is a graph showing an unwanted resonant peak in the frequency response of the tracking servo.

Various factors may cause the frequency response to depart from the desired curves. For example, a conventional lens actuator 18 has a mechanism for restoring the objective lens to a center positions, and this mechanism has a natural frequency of vibration $F_1$. Referring to FIG. 4, at this frequency $F_1$ resonance between the tracking servo and this center-restore mechanism causes a peak in the gain curve 28 of the tracking servo, so that the gain curves 28 and 30 of the tracking and seeking serves intersect at a plurality of crossover points 32. The existence of multiple crossover frequencies makes the frequency response of the combined servo control system unstable: around the frequency $F_1$ the tracking servo competes with the seeking servo and interferes with seeking control.

Novel lens actuating systems designed to solve this and other similar problems will now be described in detail. First a description will be given of a novel lens actuator 18 having an optoelectronic sensor comprising a photo-interrupter for sensing the position of the objective lens relative to the actuator frame in the X-direction.

Figure 5:
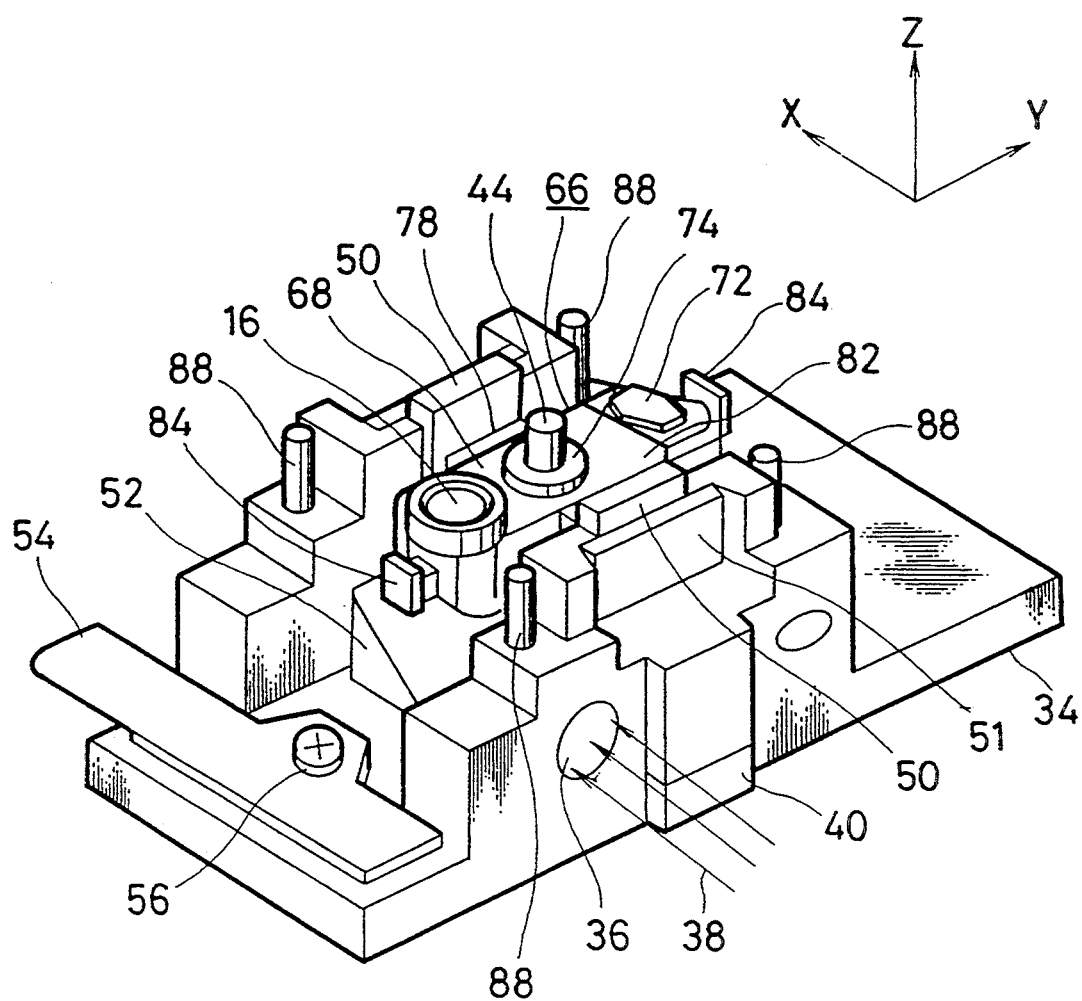
FIG. 5 is a perspective view of a novel lens actuating system.

Referring to FIG. 5, the lens actuator comprises a frame 34 having the form of a flat plate, which is rigidly attached to the carriage 10 in FIG. 1 so that the two move as a single unit. The frame 34 is separated by a central slot into two halves, which are joined by supporting structures that bridge the slot on two opposite sides. A hole 36 is provided in one of these supporting structures to admit the light beam 38.

Figure 6:
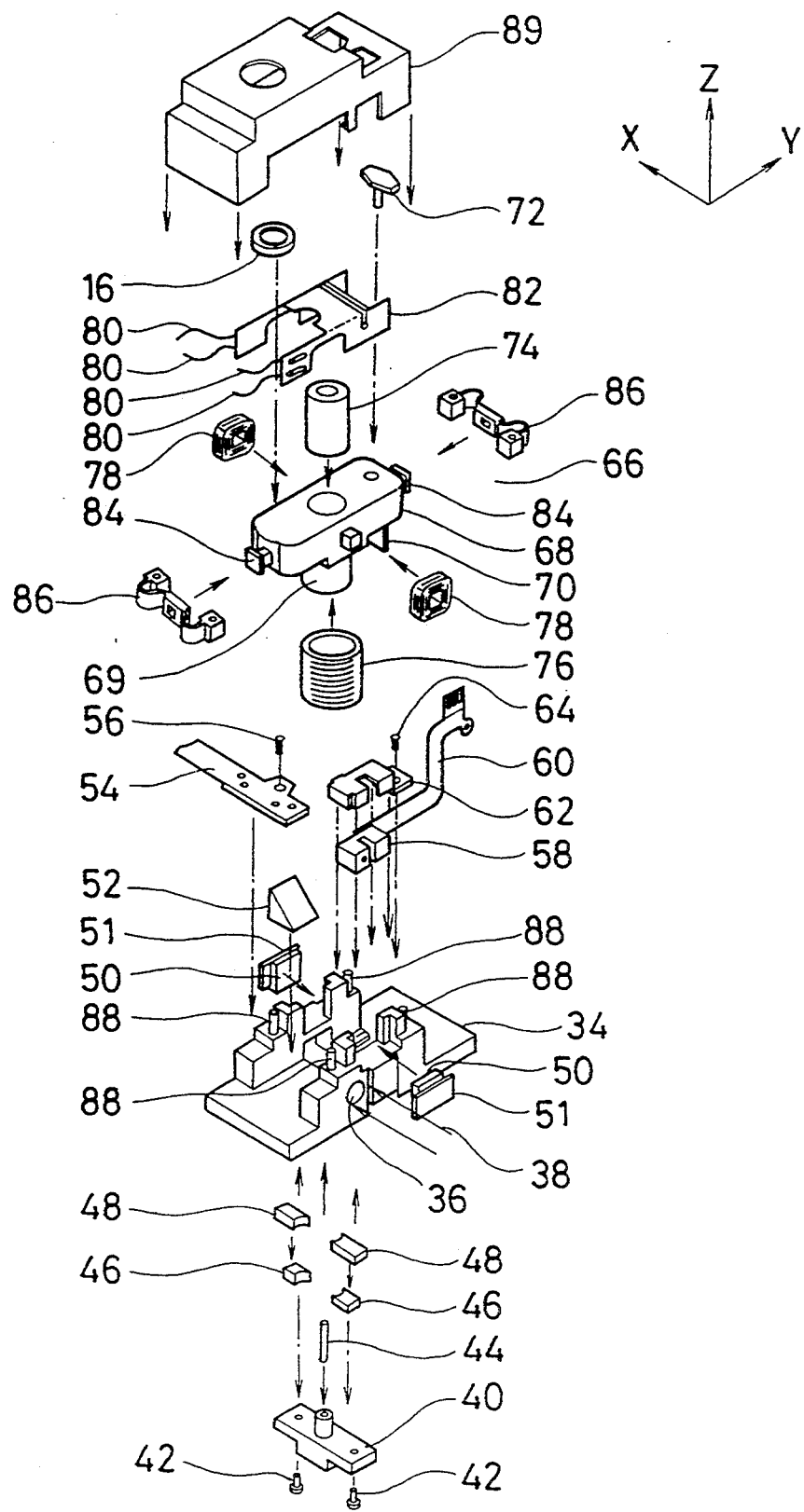
FIG. 6 is an exploded perspective view of the system in FIG. 5.

The shape of the frame 34 can be more clearly seen in the exploded view in FIG. 6. As shown in this drawing, a focusing base 40 is attached to the underside of the frame 34 by a pair of screws 42, fitting into the above-mentioned slot. The focusing base 40 is adapted to support the lower end of a vertical shaft 44, which is coated with a fluoroplastic substance having a low coefficient of friction. A pair of focusing magnets 46 and a pair of focusing yokes 48 are affixed to the upper surface of the focusing base 40, on either side of the shaft 44. The focusing magnets 46 are permanently magnetized in the Z-direction.

In the drawings, the origin of the X, Y, and Z axes is shown in an unspecified position, but it is convenient to assume that the Z-axis coincides with the central vertical axis of the shaft 44. This assumption will be made throughout the subsequent description.

A pair of tracking magnets 50 permanently magnetized in the X-direction are attached by rear yokes 51 to the supporting structures on the two sides of the frame 34. A diagonal mirror 52 is attached to the left plate section of the frame 34, in a position to reflect the light beam 38 in the upward direction, as can be seen in FIG. 5. A flexible printed circuit 54 is also attached to this section of the frame 34 by a screw 56.

Referring again to FIG. 6 a photo-interrupter 58 with an attached flexible printed circuit 60 is held against the right section of the frame 34 by a cover plate 62, which is fastened to the frame 34 by a screw 64. The photo-interrupter will be shown in more detail later.

The objective lens 16 is held in a lens assembly 66 comprising a lens holder 68 made of a lightweight, rigid plastic, with a centrally located boss 69 and a downward-projecting fin 70. The fin 70 is disposed so as to extend through a slot in the cover plate 62 of the photo-interrupter 58. The lens assembly 66 is generally oblong in shape, with a short axis and a long axis. Although the lens assembly rotates to a limited extend around the Z-axis, within its range of rotation the short axis remains substantially parallel to the X-axis and the long axis remains substantially parallel to the Y-axis, as shown in the drawing.

The objective lens 16 is mounted in a hole in the lens holder 68 disposed on the long axis of the lens assembly 66 near one end of the lens holder 68. A counterweight 72 is mounted near the opposite end of the lens holder 68, also on the long axis of the lens assembly 66.

A sleeve 74 fits into a central hole in the lens holder 68 and boss 69 and the shaft 44 passes through this sleeve 74, fitting snugly bit not tightly. A focusing coil 76 is wound around the boss 69 at its bottom. The longitudinal axes of the shaft 44, the sleeve 74, and the focusing coil 76 all coincide with the Z-axis, and the optic axis of the objective lens 16 is parallel to the Z-axis.

Tracking coils 78 are attached to the two sides of the lens holder 68 near the ends of the short axis of the lens assembly 66. Current is supplied to the focusing coil 76 and the tracking coils 78 from lead wires 80 through a flexible printed circuit 82, which also interconnects the two tracking coils 78. Projections 84 are provided at both ends of the lens assembly 66 for attachment of a pair of rubber dampers 86. The entire lens assembly 66 comprises the objective lens 16, the lens holder 68 with its boss 69, fin 70 and projections 84, the counterweight 72, the sleeve 74, the focusing cell 76, the tracking coils 78, and the flexible printed circuit board 82.

The rubber dampers 86 are attached to four pins 88 on the frame 34. The entire lens actuating system is enclosed by a cover 89 which is attached to the frame 34. The dampers 86 and cover 89 are omitted from FIG. 5 for clarity.

Figure 7:
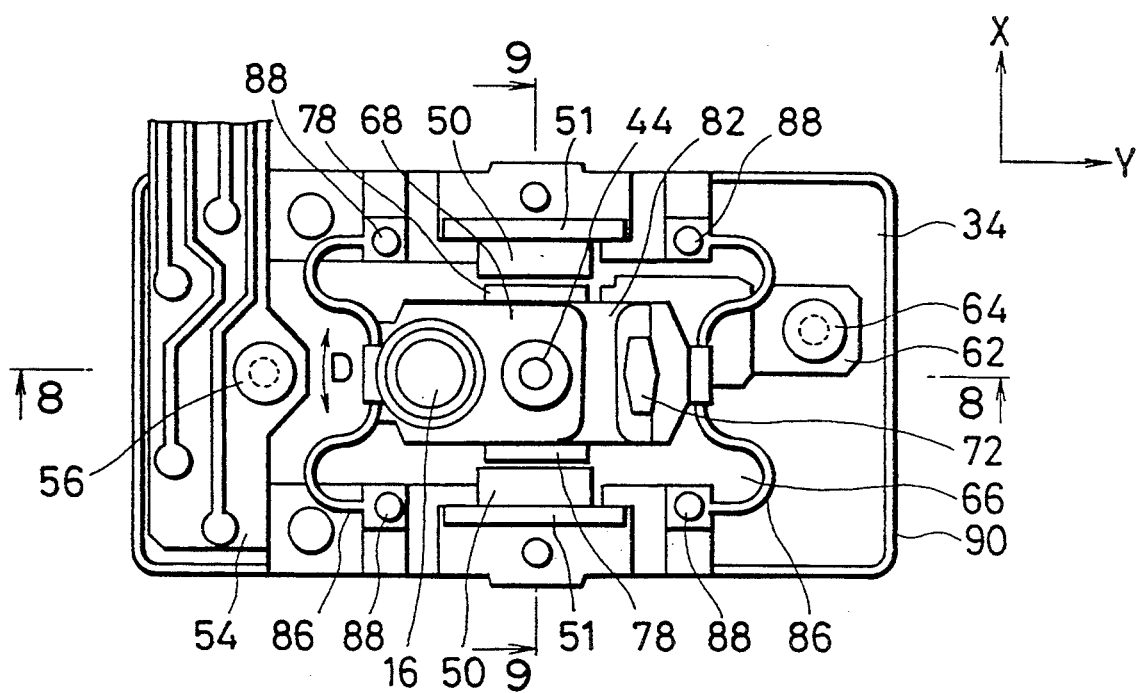
FIG. 7 is a top plan view of this system.

FIG. 7 is a top view of the lens actuating system with the cover 89 removed. The lens assembly 66 can rotate in the clockwise or counterclockwise direction around the shaft 44, as indicated by the arrow I). The range of rotation is restricted by the dampers 86, and within this range the objective lens 16 moves substantially parallel to the X-axis.

Figure 8:
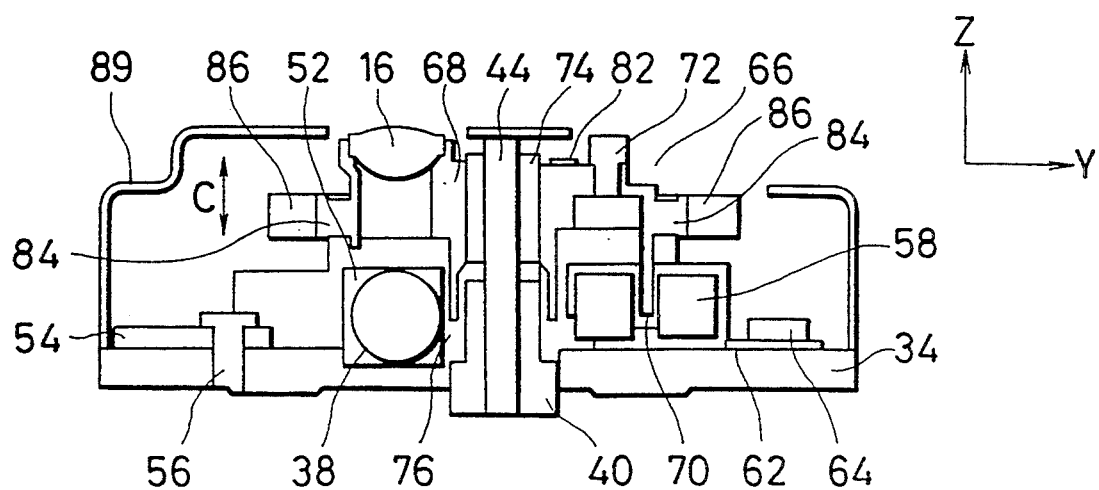
FIG. 8 is a sectional side view of this system.

FIG. 8 is a sectional side view through the line 8—8 in FIG. 7, parallel to the Y-axis, showing in particular how the fin 70 extends into the gap of the photo-interrupter 58. The lens assembly 66 is able to slide on the shaft 44 in the vertical direction as indicated by arrow C.

Figure 9:
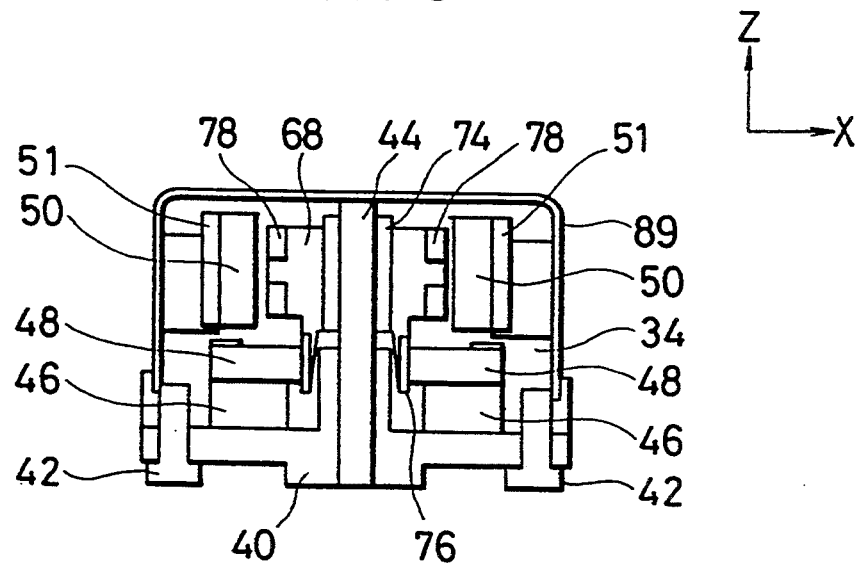
FIG. 9 is a sectional end view of this system.

FIG. 9 is a sectional end view through the line 9—9 in FIG. 7, parallel to the X-axis. As can be seen in this drawing, the focusing coil 76 is disposed in a gap between the focusing yokes 48, in which gap there exists a permanent magnetic field generated by the focusing magnets 46.

Figure 10:
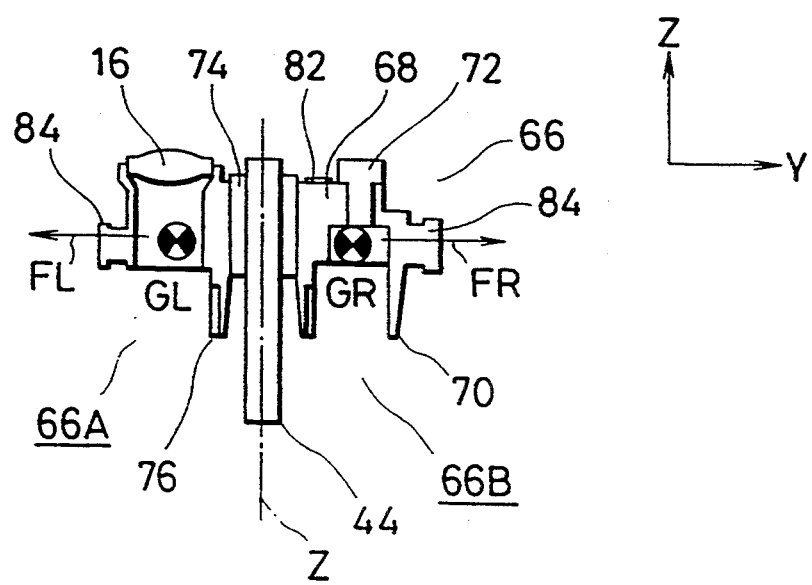
FIG. 10 is a sectional side view of the lens assembly in FIGS. 5 to 9.

FIG. 10 is a cutaway side view of the lens assembly 66. The lens assembly 66 is constructed so that its center of mass is disposed on the longitudinal axis of the shaft 44; that is, the mass of the objective lens 16 is balanced by the mass of the counterweight 72 and the mass of the fin 70. In addition, the counterweight 72 is positioned so that if the lens assembly is divided into two halves 66A and 66B by a plane containing the Z axis and the short axis of the lens assembly, the center of mass GL of the left half 66A and the center of mass GR of the right half 66B lie in the same plane perpendicular to the Z-axis.

Figure 11:
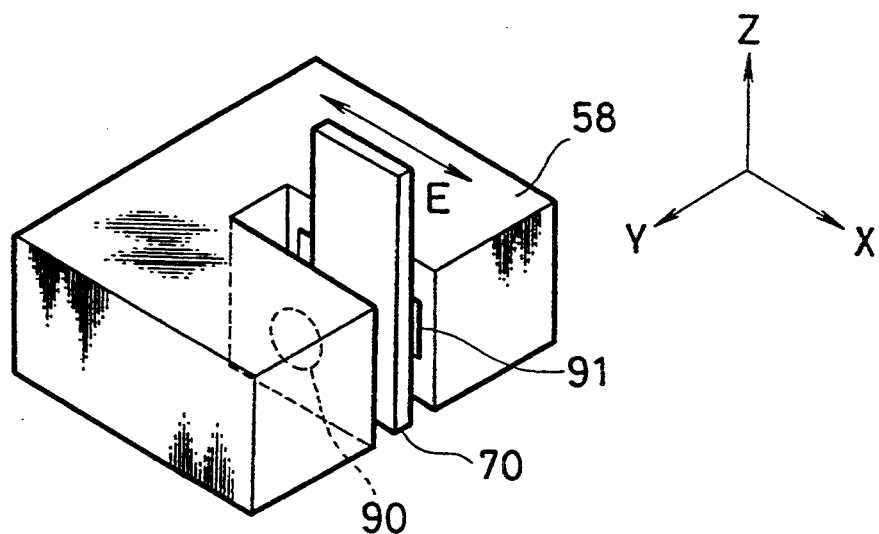
FIG. 11 is a perspective view of the optoelectronic sensor in FIGS. 6, 8, and 10.

FIG. 11 is a perspective view of the photo-interrupter 58 and fin 70. The photo-interrupter has a single light source 90 and a single photodetector 91 separated by a gap. As the lens assembly 66 rotates around the Z-axis, the fin 70 moves in the direction of arrow E in FIG. 11, thereby increasing or decreasing the amount of light transmitted from the light source 90 through the gap to the photodetector 91. The output signal of the photodetector 91 thus indicates the position of the objective lens 16 in the X-direction. The output of the photodetector 91 is unchanged by motion of the lens assembly 66 in the Z-direction.

FIG. 12A is a block diagram of the tracking servo and seeking servo of this novel lens actuating system. The tracking servo comprises the error-detecting processor 20A, phase compensator 22A, and X-direction lens actuator 18A as in FIG. 2A, and a novel velocity feedback circuit 92 and processor 93A. The velocity feedback circuit comprises, for example, a differentiating amplifier that receives and differentiates the output signal of the photodetector 91 in FIG. 11, thereby generating a velocity signal indicating the X-axis velocity of the objective lens 16 relative to the frame 34. The processor 93A comprises, for example, a summing amplifier that subtracts the velocity signal as negative feedback from the output of the phase compensator 22A and generates an electrical current which is applied to the tracking coils 78 in the X-direction lens actuator 18A of the lens actuator 18.

FIG. 12B is a block diagram of the focusing servo of this novel actuating system. It is similar to FIG. 2B, but a processor 93B is added.

Next the seeking, focusing, and track-following operation of this lens actuating system will be described.

In a seeking operation, the carriage actuator 26 moves the carriage 10 and frame 34 in the X-direction to the desired track. During most of the seeking motion (except at the beginning and end), the negative feedback loop comprising the velocity feedback circuit 92, processor 93A, and X-direction lens actuator 18A in FIG. 12A holds the lens assembly 66 in a fixed position relative to the frame 34. If an external disturbance sets the lens assembly in motion relative to the frame 34 in the X-direction, the processor 93A supplies electrical current to the tracking coils 78 to reduce this motion to zero. Accordingly, the tracking servo does not delay the seeking operation by producing unwanted motion in the X-direction.

In focusing, signals generated in the optical unit 14 in FIG. 1, indicating position of the objective lens relative to the optical disk 2 in the Z-direction, are provided to the error-detecting device 20B in FIG. 12B and subtracted from an input focusing command signal. The resulting focus error signal is fed to the phase compensator 22B for phase compensation, then to the processor 93B. The processor 93B supplies a corresponding electrical current to the focusing coil 76 in the Z-direction lens actuator 18B. The resulting magnetic field interacts with the permanent magnetic field between the focusing yokes 48, to move the lens assembly 66 in the Z-direction, thereby moving the objective lens 16 parallel to the Z-axis and adjusting the focus of the light beam on the surface of the optical disk 2.

In track-following, a signal generated in the optical unit 14, indicating position of the objective lens 16 relative to the tracks on the optical disk 2 in the X-direction, is fed back to the error-detecting circuit 20A in FIG. 12A and subtracted from an input track-following command signal. The resulting tracking error signal is fed to the phase compensator 22A for phase compensation, then to the processor 93A, which subtracts the velocity signal from the velocity feedback circuit 92 and supplies an electrical current corresponding to the difference to the tracking coils 78 in the X-direction lens actuator 18A. The resulting magnetic field interacts with the permanent magnetic field of the tracking magnets 50 to rotate the lens assembly 66 in the direction of the arrow D in FIG. 7. The objective lens 16 is thus moved in the X-direction and kept centered on the desired track.

During seeking and track-following, the novel feedback loop comprising the velocity feedback circuit 92 and processor 93A has a damping effect on the action of the tracking servo, but it does not produce extreme resonant peaks like the one at $F_1$ in FIG. 4. The gain-frequency characteristics of the tracking servo and seeking servo intersect at only a single crossover point like the point 32 in FIG. 3. In the transition between seeking and track-following, and particularly in short-distance seeking, the tracking servo and seeking servo act cooperatively, and the cooperative servo control is stable because the servos are coupled at the single crossover point 32.

Referring again to FIG. 10, during track-following, rotation of the lens assembly 66 around the Z-axis generates centrifugal force in the right and left directions, as indicated by the arrows FR and FL. Since the centers of gravity GR and GL of the right and left halves 66A and 66B of the lens assembly 66 are disposed in the same plane perpendicular to the Z-axis, however, these centrifugal forces to not tend to tilt the lens assembly 66, and control remains stable.

Figure 13:
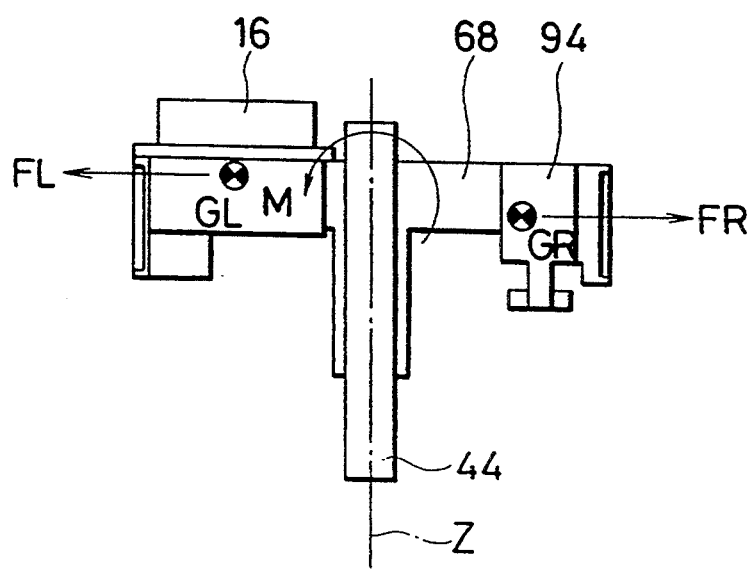
FIG. 13 is a side sectional view of the lens assembly of a prior-art lens actuating system.

For comparison, FIG. 13 shows a prior-art lens assembly in which the center of gravity GR of the right half is lower than the center of gravity GL of the left half because the counterweight 94 is disposed lower than the objective lens 16. In this case, even though the lens assembly is balanced on the shaft 44, when the lens assembly turns on the shaft 44 during track-following, centrifugal force acting on the centers of gravity GR and GL at, tempts to tilt the lens assembly by rotating it vertically in the direction of the arrow M. This creates lateral pressure on the shaft 44, generating increased friction that interferes with tracking and focusing control. Moreover, to the extent that the lens holder 68 and shaft 44 are not perfectly rigid, and to the extent that there is play between them, the lens holder 68 actually rotates in the direction of arrow M, further destabilizing the focusing and tracking servo control systems.

Figure 14:
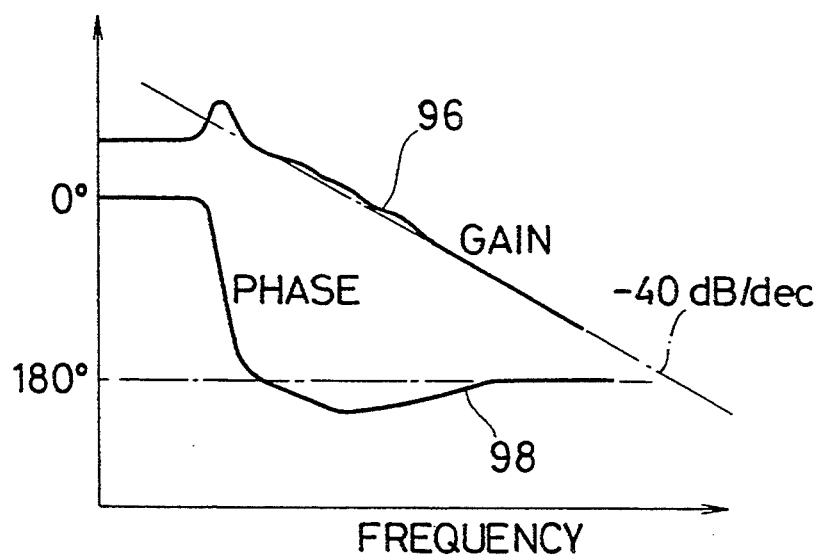
FIG. 14 is a graph of the frequency response of a prior-art lens actuating system using the lens assembly in FIG. 13.

FIG. 14 illustrates the frequency response of the tracking servo system of a prior-art lens actuating system with the lens assembly in FIG. 13. Frequency is shown on the horizontal axis. The vertical axis represents both gain and phase. The gain response 96 and phase response 98 both show irregularities attributable to the tilting effect of centrifugal force noted above, which irregularities degrade tracking performance.

Figure 15:
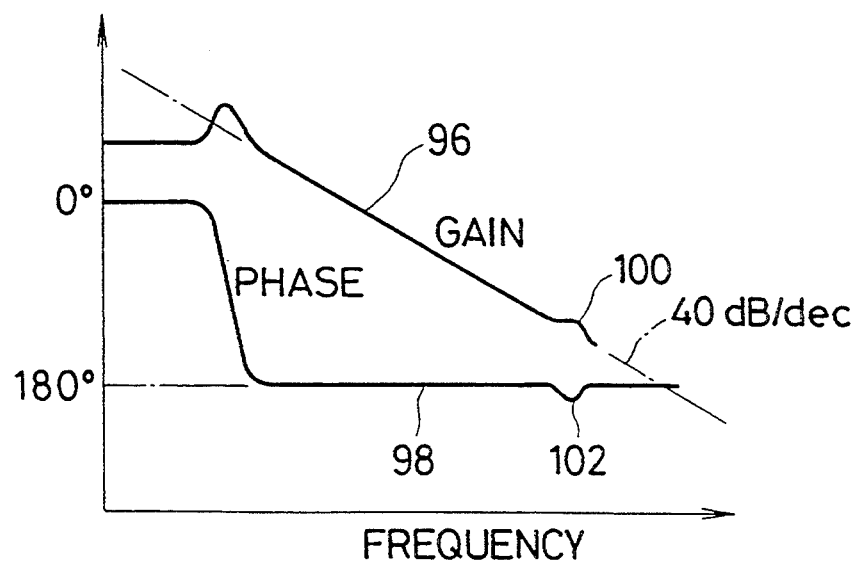
FIG. 15 is a graph of the frequency characteristics of the novel objective-lens actuating system.

FIG. 15 shows the frequency characteristics of the tracking servo when the novel lens actuating system is employed. The gain curve 96 is now more linear and the phase curve 98 more nearly flat, resulting in improved tracking performance.

There are, however, a small unwanted peak 100 in the gain curve in FIG. 15 and a small unwanted dip 102 in the please curve, which are caused by resonant vibration of the rubber dampers 86. The peak 102 and dip 104 occur even if the rubber dampers 86 are perfectly positioned. If the rubber dampers are inaccurately positioned, which is generally the case, further disturbances may occur. The novel lens actuating system can be modified to overcome these problems as described next.

Figure 16:
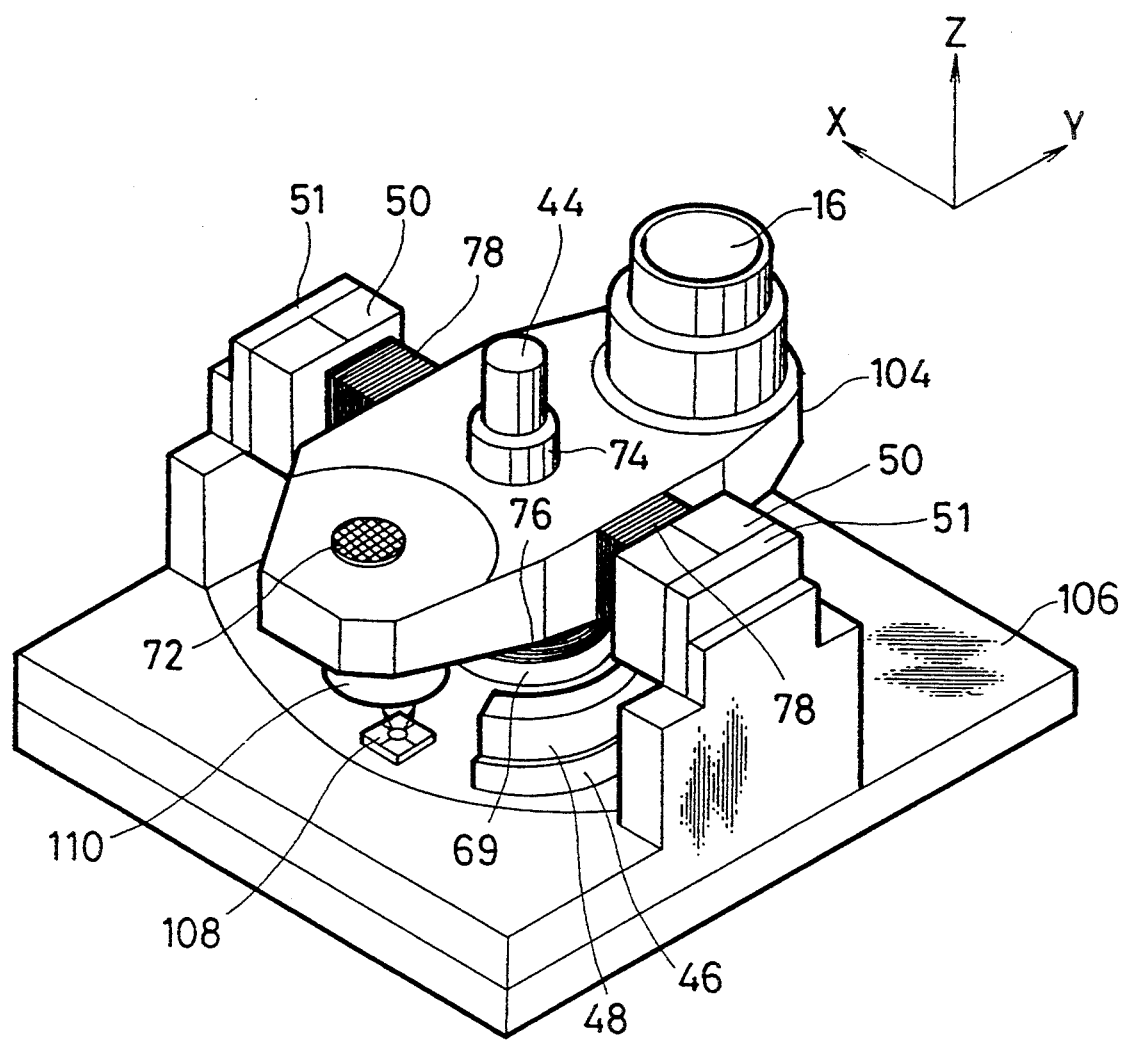
FIG. 16 is a perspective view of a novel lens actuating system with a different type of optoelectronic sensor.

The modified lens actuating system is shown in perspective view in FIG. 16. The flexible printed circuits have been left out to simplify the drawing. This lens actuating system differs from the one in FIGS. 5 to 10 in having no photo-interrupter 58 and no rubber dampers 86. Consequently, the lens holder 104 in FIG. 16 has no fin for interrupting a photo-interrupter and no projections for the attachment of rubber dampers. The frame 106 in FIG. 16 has no pins for the attachment of rubber dampers. Instead, the lens actuating system in FIG. 16 has a sensor module 108 mounted on the frame 106 under the end of the lens holder 104 with the counterweight 72, and a reflector 110 mounted on the underside of the lens holder 104 above the sensor module 108.

Figure 17:
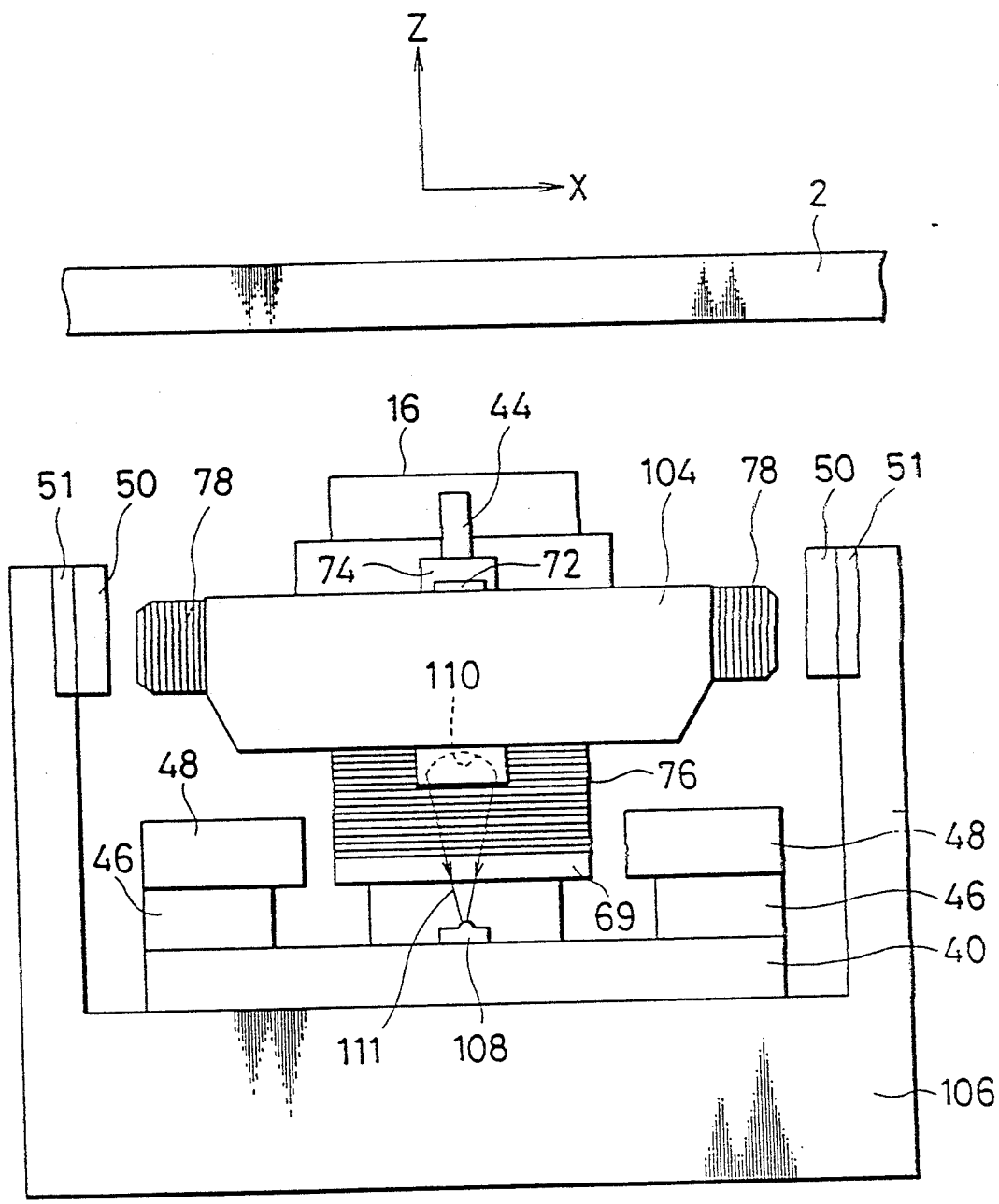
FIG. 17 is an end view of the system in FIG. 16.

FIG. 17 is an end view of this lens actuating system as seen from the end with the sensor module 108 and reflector 110. The sensor module 108 emits light 111 which is reflected by the reflector 110 and returns to the sensor module 108. The reflector 110 is a concave mirror that focuses the reflected light.

Figure 18:
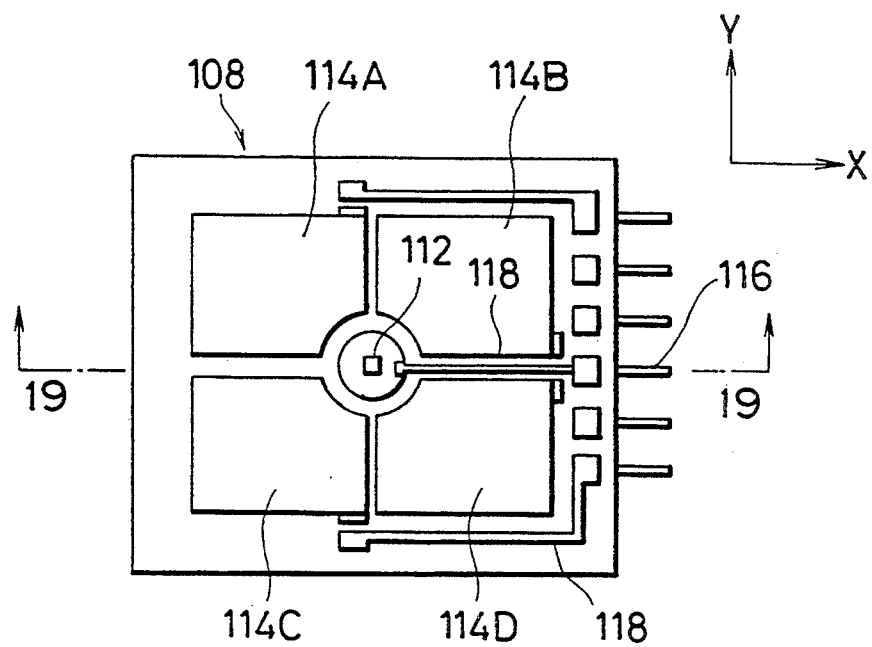
FIG. 18 is an enlarged plan view of the sensor module in FIG. 16.

An enlarged plan view of the sensor module 108 is shown in FIG. 18. A light-emitting diode 112 is disposed in the center of the sensor module 108. The light-emitting diode 112 is surrounded by a quadrant photodetector comprising four photodetector elements 114A, 114B, 114C, and 114D. Six leads 116 supply current to the light-emitting diode 112 and receive output signals from the photodetector elements 114A, 114B, 114C, and 114D via interconnection patterns 118.

Figure 19:
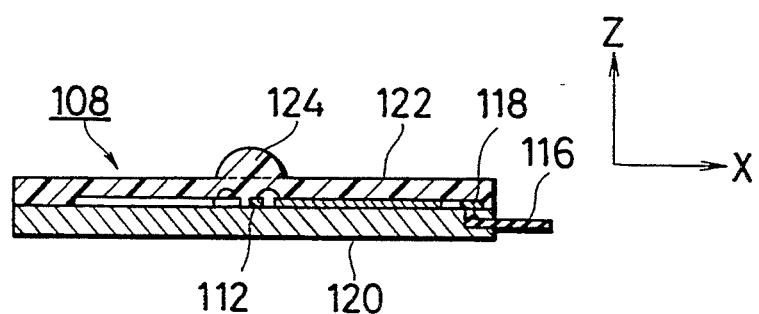
FIG. 19 is a sectional view of the sensor module.

FIG. 19 shows the sensor module 108 in sectional view through the line 19—19 in FIG. 18. The entire sensor module 108 is formed on a ceramic base 120. The photodetector elements 114A, 114B, 114C, and 114D are protected by a molded cover 122 having a molded lens 124 disposed above the light-emitting diode 112 to direct emitted light toward the reflector 110.

Figure 20:
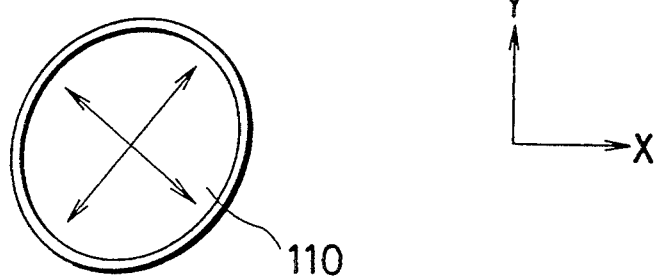
FIG. 20 is a plan view of the reflector in FIG. 16.

FIG. 20 is an enlarged plan view of the reflector 110 as seen from below. The reflector 110 is not only concave but astigmatic; that is, it has different radii of curvature in different directions. The directions of minimum and maximum radius of curvature are mutually perpendicular, and are disposed at angles of 45° to the X and Y axes of the lens actuating system. The diameters of the reflector 110 in these two directions may also differ, as indicated in FIG. 20.

Figure 21A:
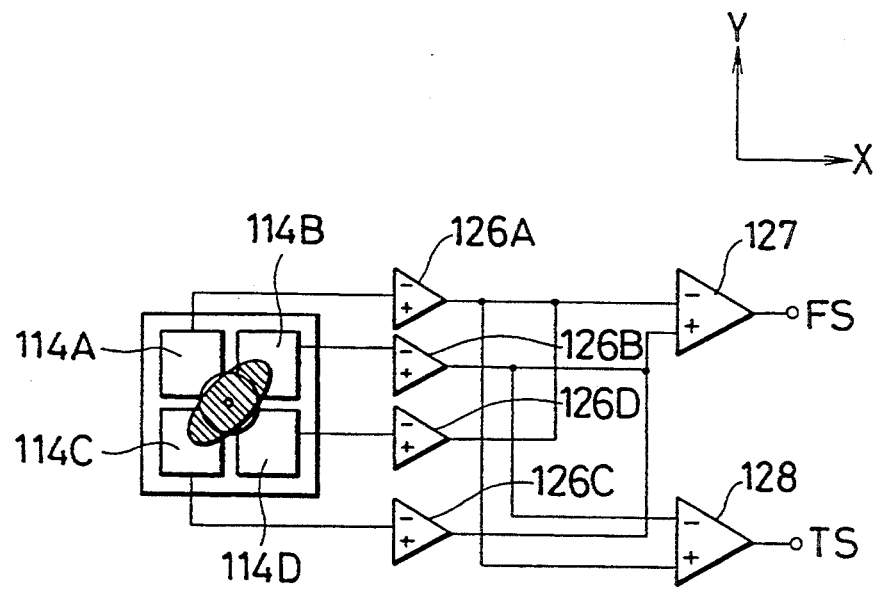
FIG. 21A is a schematic diagram of the sensor module in FIG. 16, showing associated amplifiers.

Referring to FIG. 21A, the signals output from the photodetector elements 114A, 114B, 114C, and 114D are sent to four buffer amplifiers 126A, 126B, 126C, and 126D. The outputs of these buffer amplifiers are added and subtracted by two differential amplifiers 127 and 128 to produce a tracking signal TS and a focusing signal FS. The illumination pattern on the sensor module 108 in FIG. 21A results when the reflector 110 is for example, relatively close to the sensor module 108. It can readily be seen that this will produce a negative focusing signal FS.

Figure 21B:
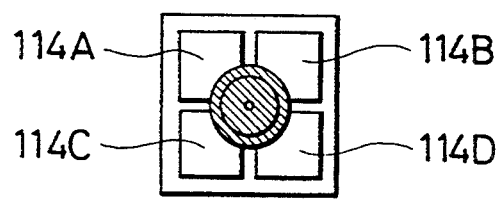
FIGS. 21B and 21C are diagrams of the sensor module showing different illumination patterns.
Figure 21C:
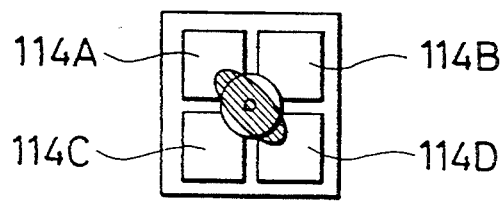

FIGS. 21B and 21C show illumination patterns resulting when the reflector 110 is disposed at an intermediate distance and a relatively large distance from the sensor module 108, respectively. In FIG. 21B the outputs from all four quadrants of the sensor module 108 are equal and the focusing signal FS is zero. In FIG. 21C the focusing signal FS is positive.

Figure 22:
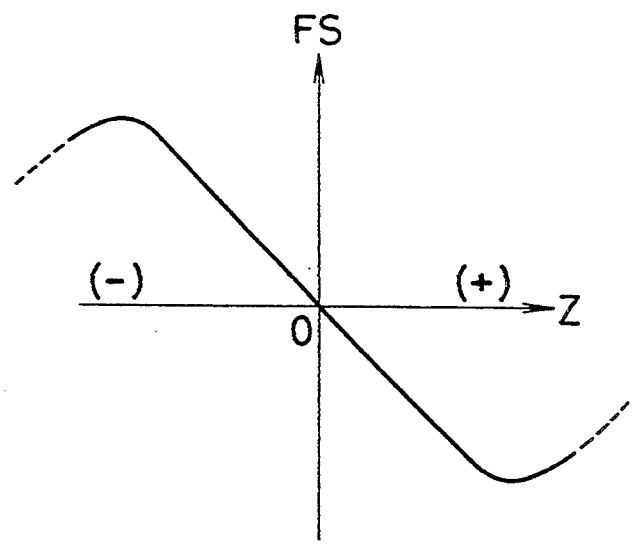
FIG. 22 is a graph of the focusing signal output of the sensor module.

Over the range of interest, the focusing signal FS is substantially linear as illustrated in FIG. 22. The horizontal axis in FIG. 22 indicates the position of the reflector 110 relative to the sensor module 108 in the Z-direction; that is, the position of the objective lens 16 relative to the frame 106 in the Z-direction. The value of the focusing signal FS is indicated on the vertical axis.

Referring again to FIG. 21A, if the position of the reflector 110 changes in the X-direction, the tracking signal TS changes. The tracking signal TS is insensitive, however, to movement in the Z-direction. For example, the tracking signal has the same value (zero) in FIGS. 21A, 21B, and 21C.

Figure 23:
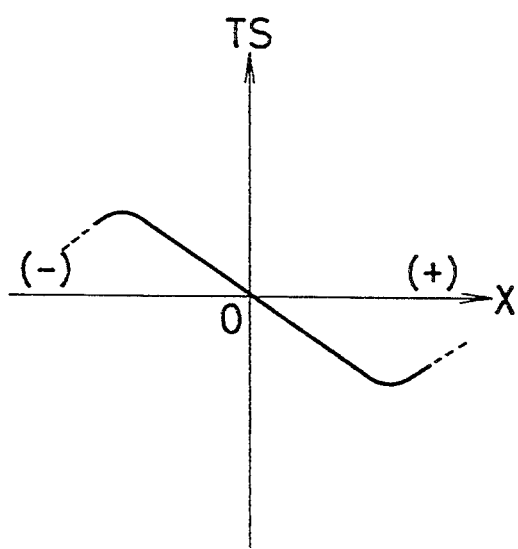
FIG. 23 is a graph of the tracking signal output of the sensor module.

FIG. 23 illustates the response of the tracking signal (TS). The horizontal axis in FIG. 23 indicates the position of the reflector 110 relative to the sensor module 108 in the X-direction; that is, the position of the objective lens 16 relative to the frame 106 in the X-direction. The value of the tracking signal TS is indicated on the vertical axis. Over the range of interest, the tracking signal TS is substantially linear and is similar to the signal from the photo-interrupter 58 in FIGS. 5 to 11.

Figure 24A:
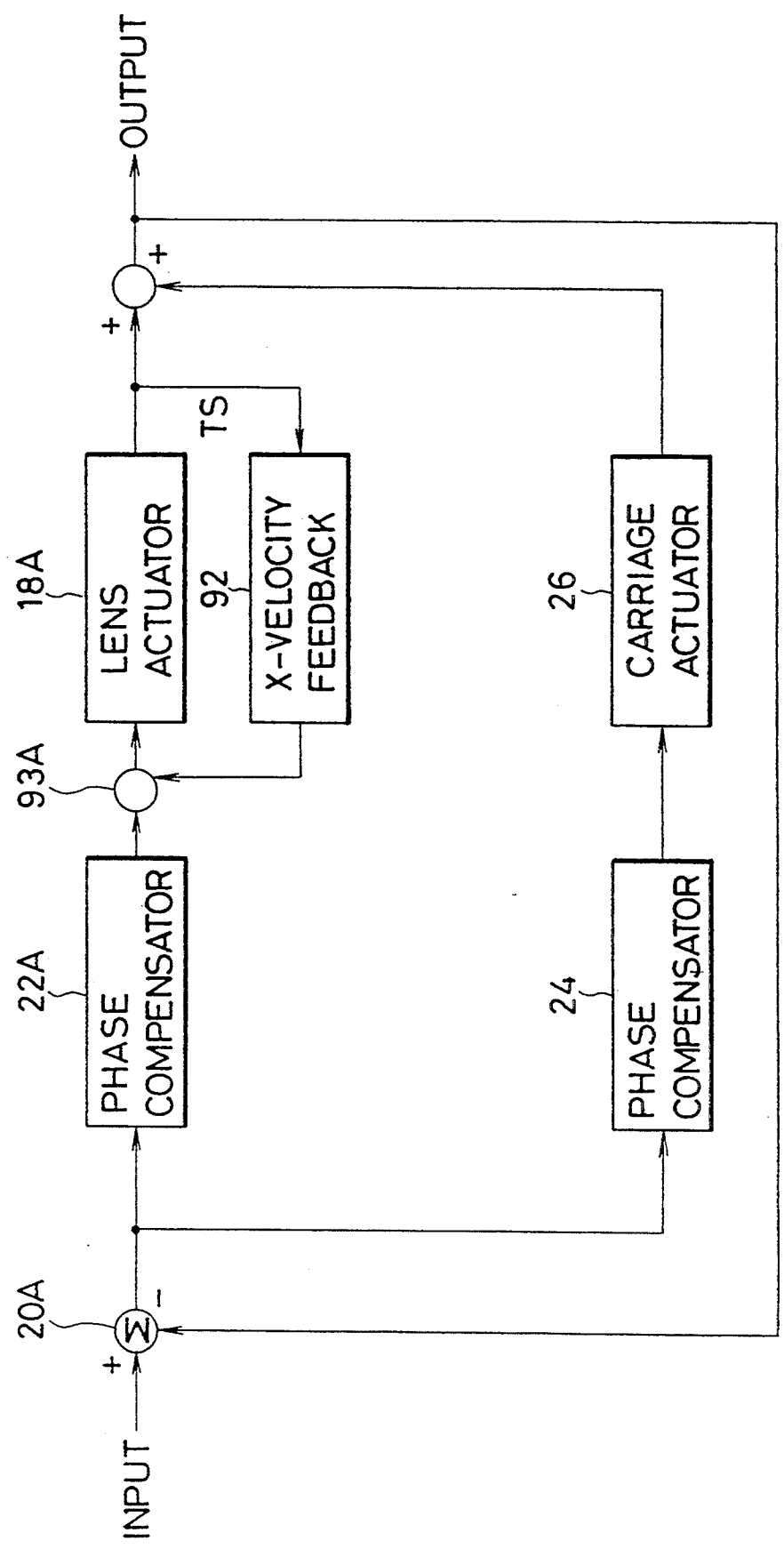

Referring to FIG. 24A, the tracking signal TS is fed back through the velocity feedback circuit 92, which detects velocity in the X-direction, to the processor 93A, which uses this velocity information in controlling the tracking cells 78 in the X-direction lens actuate 18A of the lens actuator 18. Referring to FIG. 24B, the focusing signal FS is fed back through a position feedback circuit 129, which detects position in the Z-direction, to the processor 93B, which uses this position information in controlling the focusing coil 76 in the Z-direction lens actuator 18B of the lens actuator 18.

Regarding motion in the X-direction (track-seeking and track-following), the lens actuating system shown in FIGS. 16 through 24 operates in the same way as the lens actuating system shown in FIGS. 5 through 11, the tracking signal TS taking the place of the signal from the photo-interrupter 58. Regarding motion in the Z-direction (focusing), in the initial state, when focusing control is disabled for example, the feedback loop comprising the processor 93B and position feedback circuit 129 in FIG. 24B is adapted to hold the focusing signal FS to zero, thereby keeping the objective lens 16 in a fixed neutral position in Z-direction. This feedback loop accordingly takes the place of the rubber dampers 86.

Compared with the lens actuating system in FIGS. 5 to 10, two rubber dampers, a photo-interrupter, and its cover plate have been replaced with a single sensor module 108 and a single reflector 110, so the number of assembly steps has been reduced. In addition, the overall size and mass of the lens actuating system are reduced, so the dimensions of the optical disk drive can be reduced and seek time can be shortened. The height of the lens holder 104 at which the focusing signal FS is zero can easily be adjusted by adjusting the vertical position of the sensor module 108, whereas the rubber dampers were more difficult to adjust. A further advantage is that the neutral position of the objective lens 16 and the position of resonances in the frequency characteristic of the lens actuator servo can be adjusted electrically, by adjustments to the processors 93A and 93B in FIG. 24A and FIG. 24B.

Figure 25:
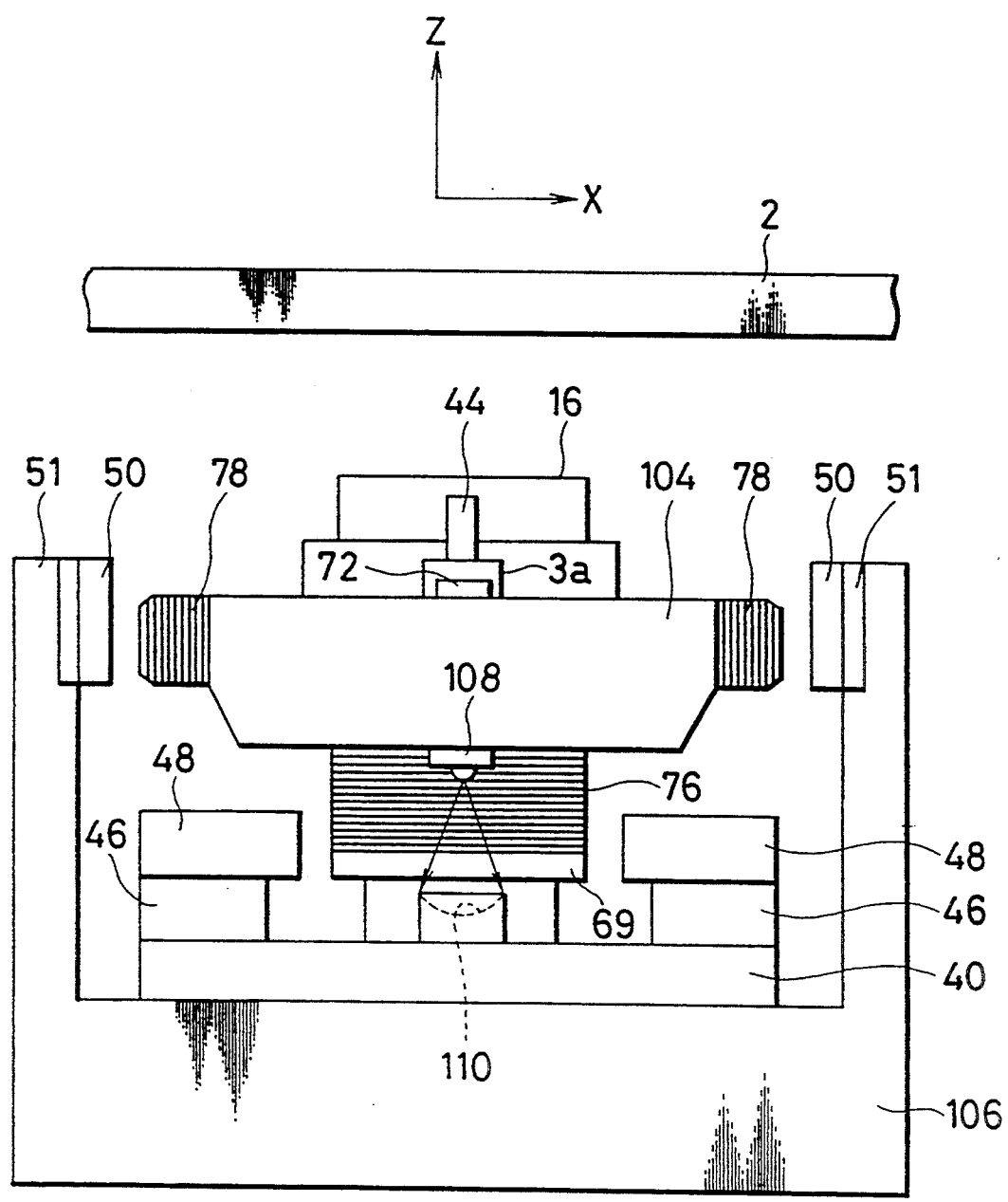
FIG. 25 is an end view illustrating a modification of the lens actuating system in FIG. 16.

The positions of the sensor module 108 and the reflector 110 can be reversed, as shown in FIG. 25, by attaching the sensor module 108 to the lens holder 104 and the reflector 110 to the focusing base 40. Reversing these positions does not change the output of the tracking and focusing signals TS and FS, so this lens actuating system operates exactly like the one in FIGS. 16 to 23.

Figure 26:
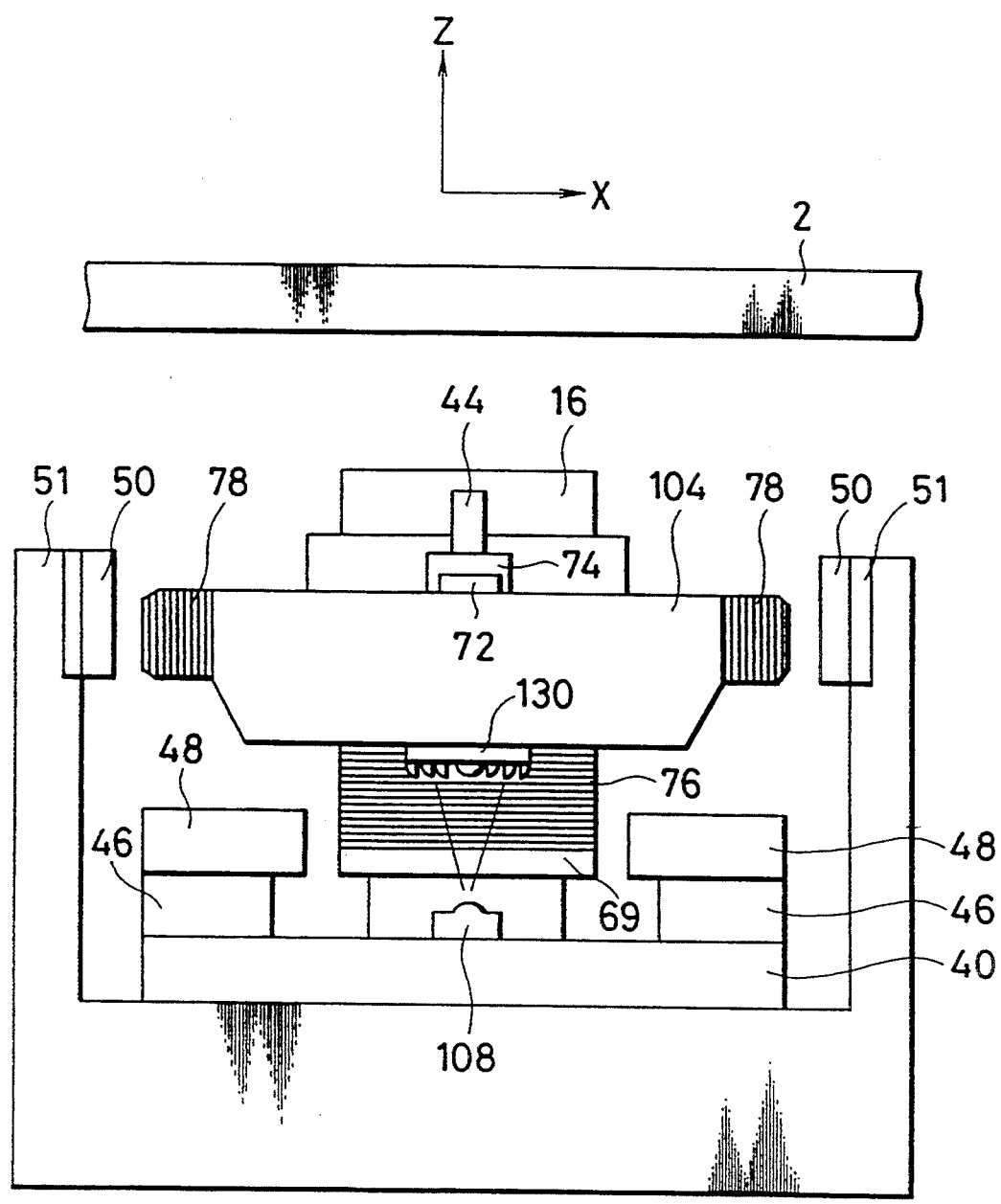
FIG. 26 is an end view illustrating another modification of the lens actuating system in FIG. 16.

Referring to FIG. 26, the concave mirror reflector 110 can be replaced with a holographic reflector 130 adapted to reflect light emitted from the sensor module 108 back to the sensor module 108 with different degrees of convergence in the X and Y directions. The same astigmatic effect is obtained as in FIGS. 21A to 21C. The positions of the sensor module 108 and the holographic reflector 130 can of course be reversed as in FIG. 25.

Figure 27:
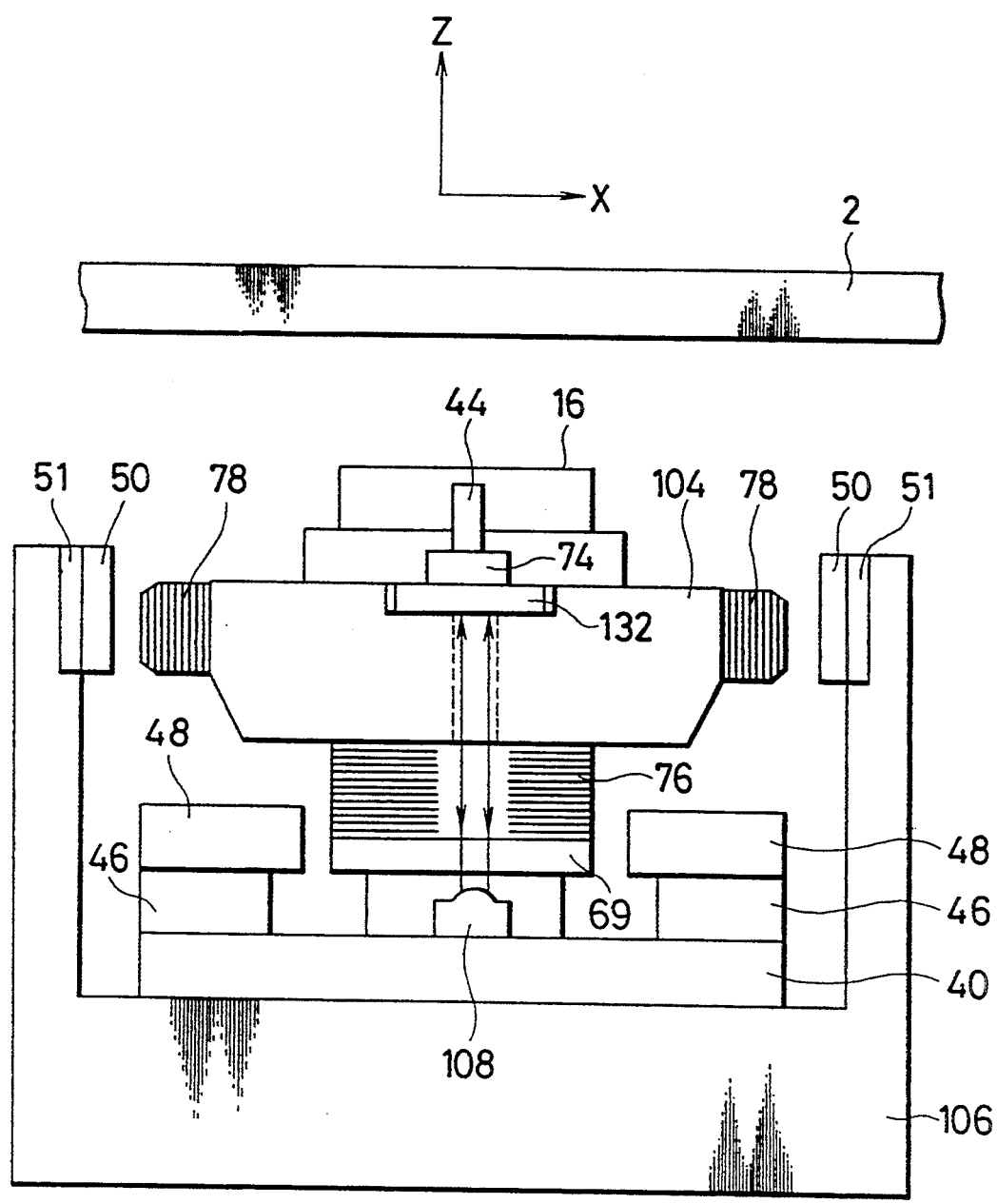
FIG. 27 end view illustrating yet another modification of the lens actuating system in FIG. 16.

Referring to FIG. 27, if the size and weight of the reflector are increased, then in addition to reflecting light back to the sensor module 108, the reflector can function as a counterweight. FIG. 27 shows a lens actuating system with such a reflector-counterweight 132. Astigmatism can moreover be created by time sensor module 108 itself, by suitable shaping of the molded lens 124 In FIG. 19, in which case the reflector-counterweight 132 can have a flat mirror surface. This lens actuating system has the advantages of even easier fabrication and assembly than the lens actuating system in FIGS. 16 to 26.

Figure 28:
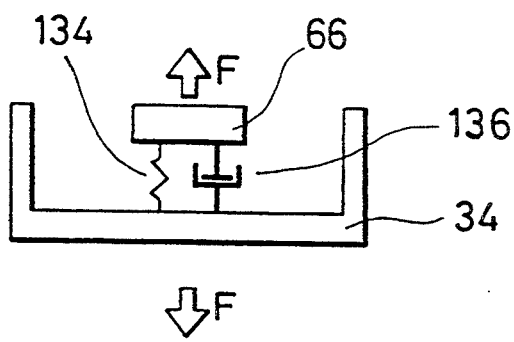
FIG. 28 is an abstract schematic diagram illustrating mechanical coupling between the lens assembly and frame.

There remains, however, the problem of the coupling of mechanical energy from the lens actuator 18 to the optical disk 2. Within the lens actuator 18, the coupling between the lens assembly 66 and frame 34 can be depicted schematically as in FIG. 28, the various mechanical components depleted in FIGS. 1 to 27 being represented by an abstract spring 134 and damper 136. If the lens actuator 18 moves the lens assembly 66 upward with a force F, for example, an equal and opposite downward force is transmitted to the frame 34. From the frame 34, this opposite force is transmitted through the carriage 10, bearings 12, base 6, and spindle motor 4 to the optical disk 2.

Figure 29:
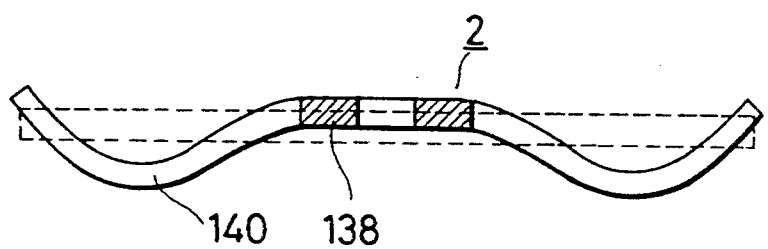
FIG. 29 is a sectional view of the optical disk, illustrating resonant vibration excited as a result of the above mechanical coupling.

The optical disk 2 has a natural frequency or vibration in the low kilohertz range, at about 1.4 kHz for a 90-millimeter disk for example. Focusing motion of the lens assembly, transmitted to the optical disk 2 as described above, can easily excite vibration at this frequency, with the result that the optical disk 2 deforms as shown (with considerable exaggeration) in FIG. 29. That is, the central hub 138 of the disk 2 and its outer rim deform in one direction while the intermediate information-carrying section 140 deforms in the opposite direction.

Figure 30:
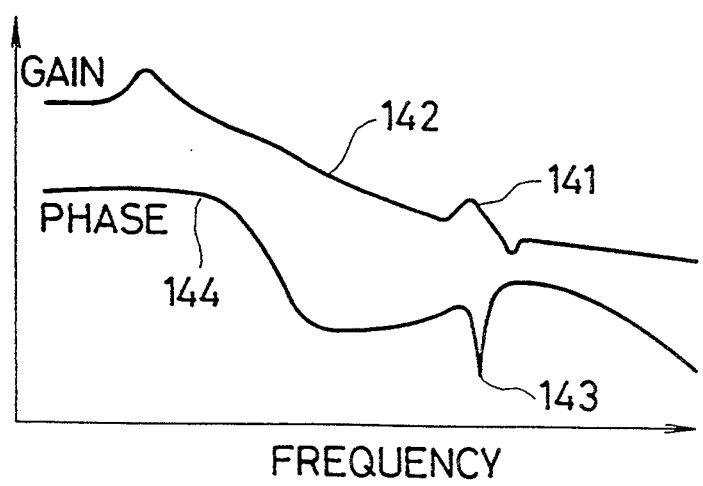
FIG. 30 is a graph illustrating the effects of this resonant vibration on the frequency characteristics of the focusing servo.

FIG. 30 shows the frequency response of the focusing servo, showing frequency on the horizontal axis and gain and phase on the vertical axis. Resonant vibration of the optical disk 2 causes various irregularities, such as a resonant peak 141 in the gain characteristic 142 and an abrupt lag 143 in the phase characteristic 143. These irregularities can be explained in general terms by noting that the focusing servo is disturbing the quantity (distance from the objective lens to the disk) that it is attempting to control.

Figure 31:
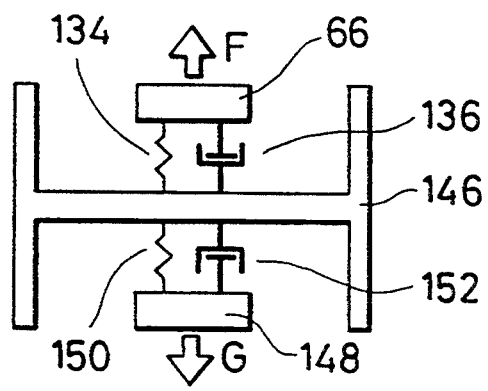
FIG. 31 is an abstract schematic diagram illustrating a novel scheme for solving the problem of resonant vibration of the optical disk.

FIG. 31 abstractly illustrates a general scheme for solving this problem. The frame 146 is coupled both to the lens assembly 66 by the spring 134 and damper 136, and to a driven mass 148 by a similar spring 150 and damper 152. The lens assembly 66 and driven mass 148 are disposed on opposite sides of the frame 146. When the lens assembly 66 is driven in the upward direction with a force F, the driven mass 148 is driven in the downward direction with an equal and opposite force G, so that the net force transmitted to the frame 146 is zero. This scheme can be implemented in various ways as described next.

Figure 32:
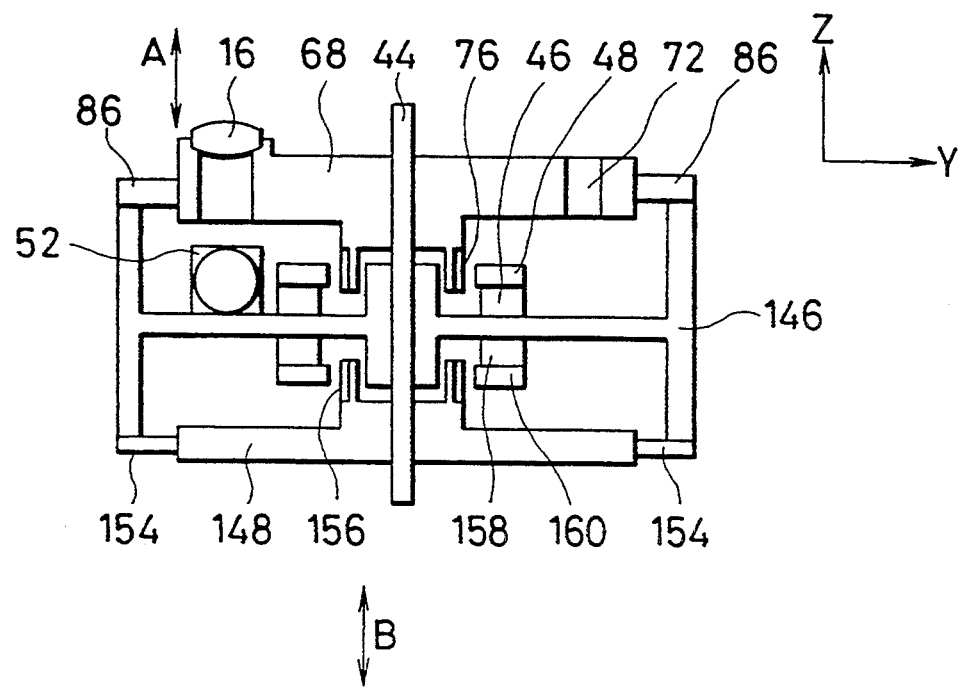
FIG. 32 is a sectional view of a novel lens actuating system implementing the scheme of FIG. 31.

Referring to FIG. 32, in one implementation the frame 146 is generally similar to the frame 34 in FIGS. 5 to 10 but is vertically symmetrical. The shaft 44 is held in the center by the frame 146 and extends in both upward and downward Z-directions. A lens assembly with a lens holder 68, objective lens 16, and counterweight 72 is mounted on the upper part of the shaft 44 as already described. The lens assembly is shown coupled to the frame 146 by dampers 86, but the alternative schemes shown in FIGS. 16 to 28 can of course be used instead. The photo-interrupter assembly or the reflector and photodetector used in place thereof are omitted for clarity. The diagonal mirror 52, focusing magnets 46, focusing yokes 48, and focusing coil 76 are the same as in FIGS. 5 to 10.

The lower part of the shaft 44 supports a driven mass 148, which is coupled to the frame 146 by dampers 154 similar to the dampers 86. The driven mass 148 is actuated in the Z-direction by a coil 156, magnets 158, and yokes 160 similar to the focusing coil 76, focusing magnets 46, and focusing yokes 48.

Figure 33:
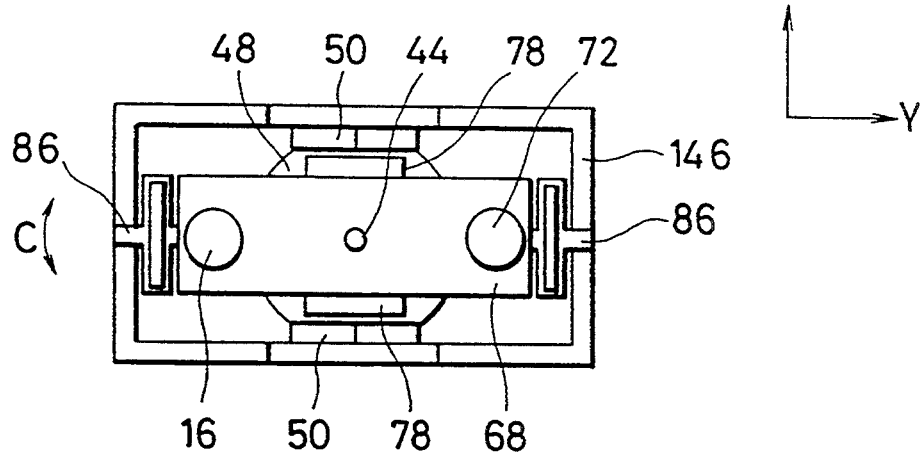
FIG. 33 is a top plan view of the lens actuating system in FIG. 32.

FIG. 33 is a plan view of this lens actuating system as seen from above, showing the objective lens 16, counterweight 72, and dampers 86. Also shown are the tracking coils 78 and tracking magnets 50 for rotating the lens holder 68 during track-following. The dampers 86 in FIG. 33 are attached to the frame 146 at a single point each, instead of at two points as in FIG. 7. Either attachment scheme can be used: the dampers shown in FIG. 7 can be used in the lens actuating system in FIG. 33, or the dampers shown in FIG. 33 can be used in the lens actuating system shown in FIGS. 5 to 10.

Figure 34:
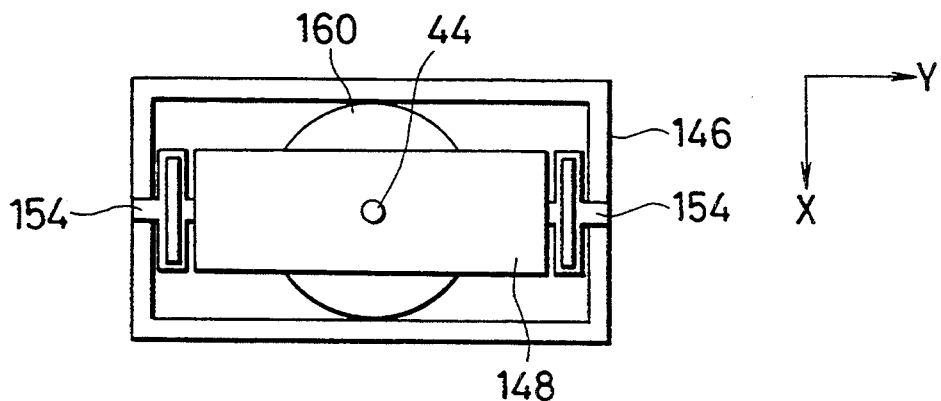
FIG. 34 is a bottom plan view of the lens actuating system in FIG. 32.

FIG. 34 is a bottom plan view of the lens actuating system as seen from below, showing the driven mass 148, yokes 160, and dampers 154. The driven mass 148 has a simple structure with no lens, no balance weight, and no tracking magnets or coils. It is not necessary for the driven mass 148 to equal the mass of the lens holder 68.

Next the focusing operation of this lens actuating system will be described. Tracking operation will not be described since it is the same as described previously.

When focusing error is detected, the focusing coil 76 is energized to move the lens holder 68 so as to correct the error. At the same time, the coil 156 is energized so as to move the driven mass 148 in the opposite direction. The amount of current supplied to the coil 156 is controlled so that the force acting on the driven mass 148 is equal in magnitude to the force acting on the lens assembly 66. The two forces act in opposite directions, so they cancel, and the net force transmitted to the frame 146 is zero. The light beam can thus be focused without causing resonant vibration of the optical disk 2, and unwanted resonant peaks like those noted in FIG. 30 do not appear.

Figure 35:
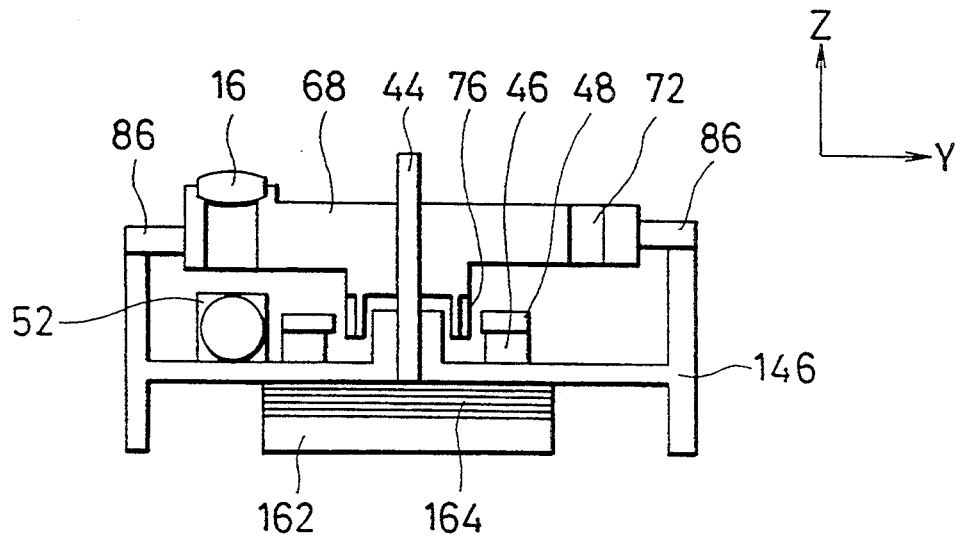
FIG. 35 is a sectional view of another novel lens actuating system implementing the scheme of FIG. 31.

Referring to FIG. 35, the driven mass 162 can be piezoelectricity actuated, instead of driven by a coil as in FIGS. 32 to 34. The lens actuating system in FIG. 35 comprises a driven mass 162 which is driven by a laminated piezoelectric actuator 164. Other elements are the same as in FIG. 32. When exciting current is applied to the focusing coil 76 to drive the lens assembly 66 in one direction, voltage is applied to the piezoelectric actuator 164 to drive the driven mass 162 with equal force in the opposite direction.

Figure 36:
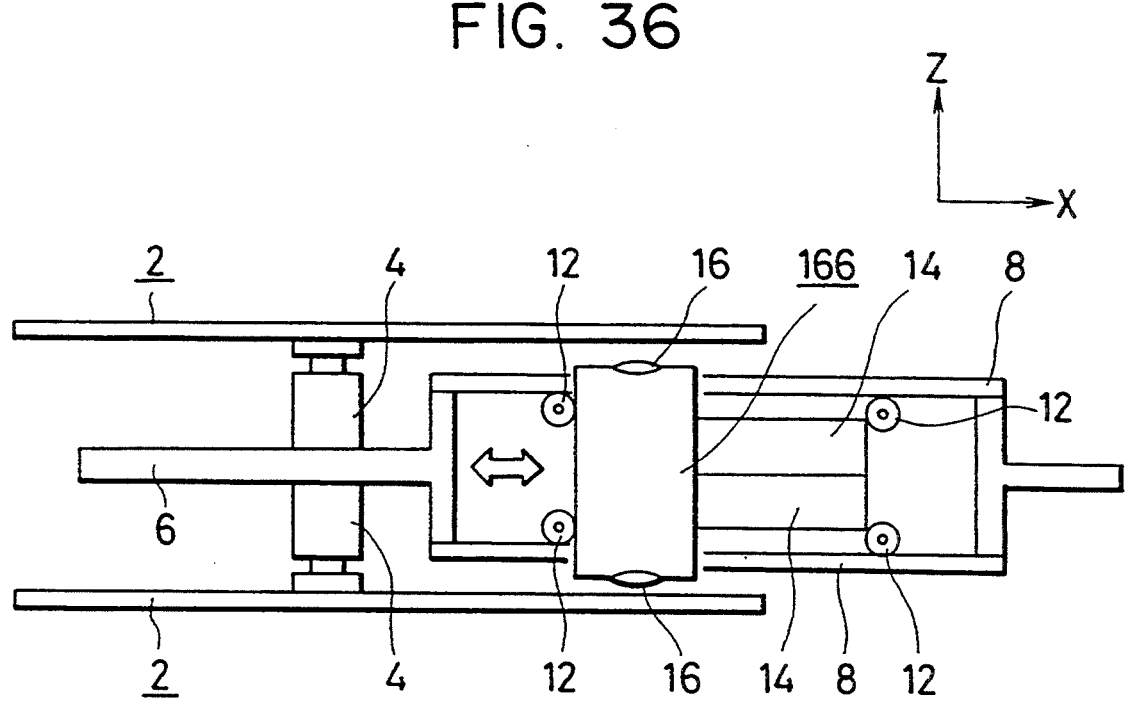
FIG. 36 is a sectional view of a dual lens actuating system implementing the scheme of FIG. 31.

Referring to FIG. 36, this principle can be advantageously applied in an optical disk drive having two optical disks 2. The base 6 in this drive supports two rails 8 with bearings 12 on which a carriage (not explicitly indicated in the drawing) can move in the direction of the arrow. Mounted on the carriage are two optical units 14, each of which produces a light beam. The two light beams are focused onto respective optical disks 2 by two objective lenses 16. The objective lenses 16 can be moved in the X- and Z-directions by a dual lens actuator 166.

Figure 37:
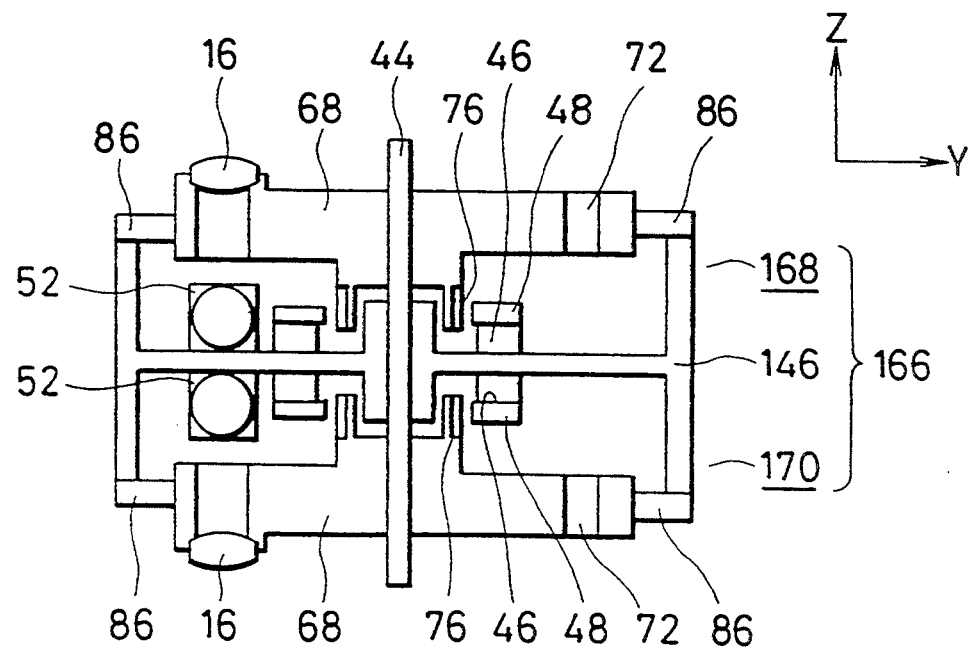
FIG. 37 is a more detailed sectional view of the dual lens actuating system in FIG. 36.

FIG. 37 shows the dual lens actuator 166 in more detail. The frame 146 and upper actuator 168 are as already described in FIG. 32, identical components having the same reference numerals. The lower actuator 170 is symmetrically identical to time upper actuator 168, with the same reference numerals again being used to denote its components.

When the upper disk optical disk 2 is accessed, this system operates like the one in FIG. 32 or FIG. 35. The focusing servo in dual lens actuator 166 controls the focusing coil 76 in the upper actuator 168 to maintain correct focus on the upper disk optical disk 2 in FIG. 36, and controls the focusing coil 76 in the lower actuator 170 to exert equal force in the opposite direction, so that the two forces cancel when transmitted to the frame 146.

When the lower disk optical disk 2 is accessed, the roles of the upper actuator 168 and lower actuator 170 are reversed. The focusing servo in the dual lens actuator 166 controls the focusing coil 76 in the lower actuator 170 to maintain correct focus on the lower disk optical disk 2 in FIG. 36, and controls the focusing coil 76 in the upper actuator 168 to exert equal force in the opposite direction, so that the forces transmitted to the frame 146 again cancel. Regardless of whether the upper or lower optical disk 2 is accessed, no resonant vibrations are excited in either disk.

Figure 38:
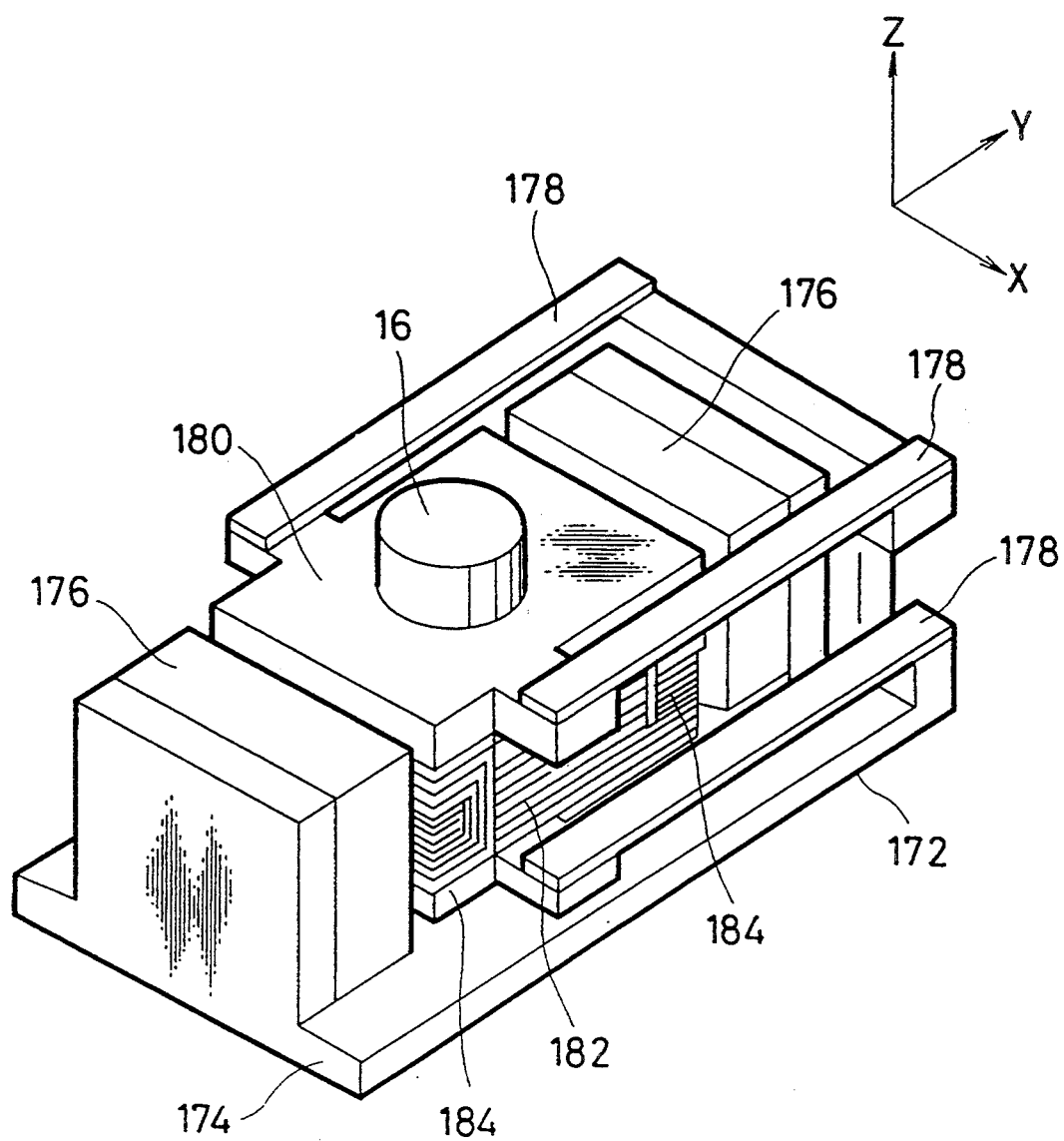
FIG. 38 is a perspective view of still another novel lens actuating system.
Figure 39:
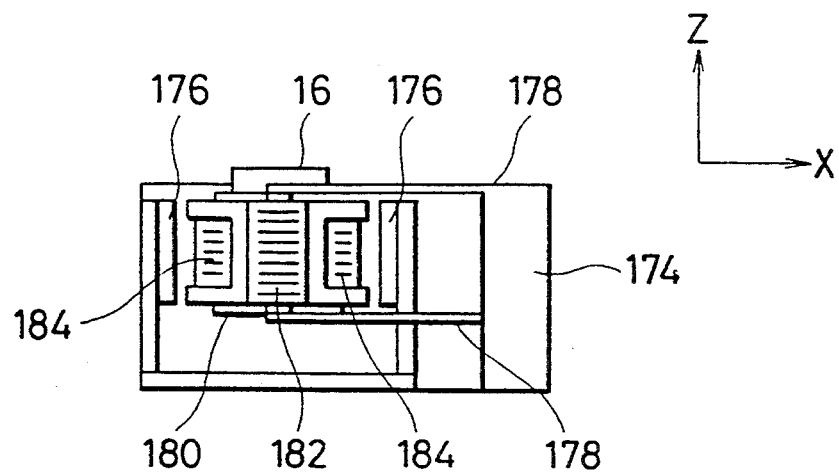
FIG. 39 is a sectional view of the lens actuating system in FIG. 38.
Figure 40:
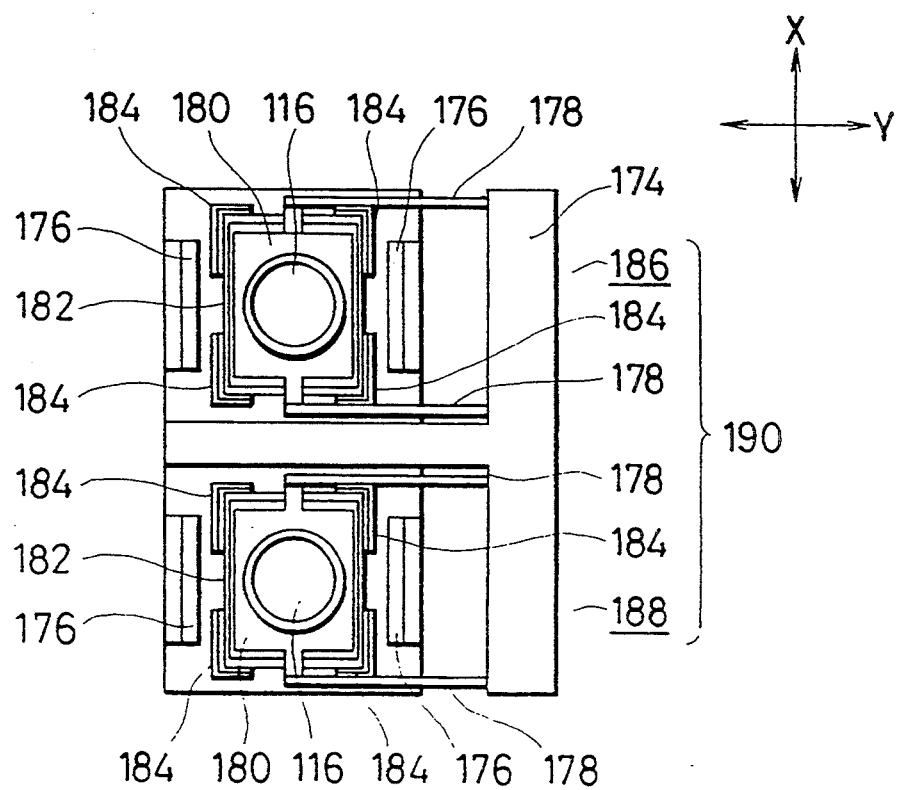
FIG. 40 is a plan view of a dual lens actuating system implementing the scheme of FIG. 31 in the track-following direction.

FIGS. 38, 39, and 40 show an lens actuating system in which the above principle of canceling forces is applied in the X-direction. The perspective view in FIG. 38 shows one lens actuator 172 comprising a frame 174 at opposite ends of which are mounted two permanent magnets 176. Four leaf springs 178 are attached to one end of the frame 174. (The fourth leaf spring 178 is not shown, being obscured by the other components; it is attached to the lower rear portion of the frame 174 and is parallel to the other three leaf springs 178.) The four leaf springs 178 support a lens holder 180 having an objective lens 16 for focusing laser light. The lens holder 180 is provided with a focusing coil 182 and four tracking coils 184, only two of which are visible in the drawing.

FIG. 39 is a side view of the lens actuating system in FIG. 38. Optical components such as a mirror to reflect the light beam to the objective lens 16 have been omitted for clarity.

As shown in FIG. 40, a first lens actuator 186 and a second lens actuator 188, each identical to the lens actuator 172 in FIGS. 38 and 39, are mounted side-by-side on the same frame 174 to form a dual lens actuator 190. FIG. 39 also shows the disposition of the tracking coils 184 at the four corners of the lens holders 1.80 in the first and second lens actuators 186 and 188.

Referring again to FIG. 38, during operation the focusing coil 182 is excited by the focusing servo to produce a magnetic field that interacts with the magnetic field of the permanent magnets 176 to drive the objective lens 16 in the Z-direction. The tracking coils 184 are excited by the tracking servo system to produce a magnetic field that interacts with the magnetic field of the permanent magnets 176 to move the objective lens 16 in the X-direction.

Referring to FIG. 40, force generated by the first lens actuator 186 to move its objective lens 116 in the positive X-direction, for example, creates an equal reactive force in the negative X-direction. To cancel this force, the second lens actuator 188 generates an equal force in the negative X-direction, creating an equal reactive force in the positive X-direction. The net force transmitted to the frame 174 is therefore zero.

The first and second lens actuators 186 and 188 in FIG. 40 are preferably disposed so that one objective lens faces up and the other objective lens faces down, thus permitting access to information on two optical disks 2 as in FIG. 36. Moreover, the scheme for canceling tracking force shown in FIGS. 38 to 40 can be combined with the scheme for canceling focusing force shown in FIGS. 32 to 35, so that neither horizontal nor vertical forces are transmitted to the optical disk 2, thus assuring that no resonant vibrations of the optical disk 2 are excited.

As will be apparent to those ski[l]ed in the art, the lens actuating systems shown in the drawings can be modified in various ways without departing from the spirit and scope of the invention as set forth in the following claims. For example, the optoelectronic sensors shown in FIGS. 5 to 27 can be combined with the leaf-spring support system in FIGS. 38 to 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens actuating system for an optical read and/or write apparatus that uses a light beam to read information from and/or write information to tracks on an optical recording medium, comprising:
    a frame having a Z-axis perpendicular to a surface of the optical recording medium and an X-axis perpendicular to said Z-axis and perpendicular to said tracks;
    a lens assembly, movably mounted on said frame, having an objective lens for focusing said light beam onto said optical recording medium;
    a seeking servo for moving said frame parallel to said X-axis;
    a tracking servo for moving said lens assembly relative to said frame to move said objective lens parallel to said X-axis;
    a focusing servo for moving said lens assembly relative to said frame to move said objective lens parallel to said Z-axis;
    an optoelectronic sensor for generating a first output signal representing a position of said objective lens relative to said frame on said X-axis; and wherein
    said tracking servo has a frequency response including a first gain curve, said seeking servo has a frequency response including a second gain curve, and said first gain curve intersects said second gain curve at only a single frequency, and said first gain curve is higher than said second gain curve at frequencies higher than said single frequency and lower than said second gain curve at frequencies lower than said single frequency.

2. The system of claim 1, wherein said tracking servo receives said first output signal from said optoelectronic sensor and holds said lens assembly in a fixed position relative to said frame on said X-axis while said seeking servo is moving said frame parallel to said X-axis.

3. A lens actuating system for an optical read and/or write apparatus that uses a light beam to read information from and/or write information to tracks on an optical recording medium, comprising:
    a frame having a Z-axis perpendicular to a surface of the optical recording medium and an X-axis perpendicular to said Z-axis and perpendicular to said tracks;
    a lens assembly, movably mounted on said frame, having an objective lens for focusing said light beam onto said optical recording medium;
    a seeking servo for moving said frame parallel to said X-axis;
    a tracking servo for moving said lens assembly relative to said frame to move said objective lens parallel to said X-axis;
    a focusing servo for moving said lens assembly relative to said frame to move said objective lens parallel to said Z-axis;
    an optoelectronic sensor for generating a first output signal representing a position of said objective lens relative to said frame on said X-axis; and wherein said tracking servo comprises:
        a velocity feedback circuit for receiving said first output signal from said optoelectronic sensor and for generating, therefrom, a velocity signal representing a velocity at which said objective lens moves relative to said frame on said X-axis;
        a processor coupled to receive a lens actuator signal and said velocity signal from said velocity feedback circuit and generate a first electrical current based on said lens actuator signal and said velocity signal;
        at lease one tracking coil attached to said lens assembly, for receiving said electrical current and generating a magnetic field; and
        at least one permanent magnet attached to said frame, for creating a permanent magnetic field that interacts with the magnetic field generated by said tracking coil to exert force parallel to said X-axis.

4. The system of claim 3, wherein said tracking servo receives said first output signal from said optoelectronic sensor and holds said lens assembly in a fixed position relative to said frame on said X-axis while said seeking servo is moving said frame parallel to said X-axis.

5. A lens assembly rotationally driven around a Z-axis perpendicular to a surface of an optical recording medium in an optical read and/or write apparatus, comprising:
    a lens holder having a short axis perpendicular to said Z-axis and a long axis perpendicular to both said Z-axis and said short axis;
    an objective lens, mounted on said lens holder near one end of said long axis, for focusing a light beam onto said optical recording medium; and
    a counterweight, mounted on said lens holder near another end of said long axis, for counterbalancing said objective lens so that said lens assembly has a center of mass disposed on said Z-axis, and so that if said lens assembly is divided into two halves by a first plane containing said Z-axis and said short axis, both of said halves have centers of mass disposed in a single second plane perpendicular to said Z-axis.

6. The lens assembly of claim 5, wherein said counterweight is a reflector used for sensing position of said lens assembly.

7. The lens assembly of claim 5, further comprising at least one tracking coil for generating a magnetic field that interacts with an external magnetic field to rotate said lens assembly around said Z-axis.

8. The lens assembly of claim 5, further comprising a focusing coil for generating a magnetic field that interacts with an external magnetic field to move said lens assembly parallel to said Z-axis.

9. A lens actuating system for an optical read and/or write apparatus that uses a light beam to read information from and/or write information to tracks on an optical recording medium, comprising:
   a frame having a Z-axis perpendicular to a surface of the optical recording medium and an X-axis perpendicular to said Z-axis and perpendicular to said tracks;
   a lens assembly, movably mounted on said frame, having an objective lens for focusing said light beam onto said optical recording medium;
   a seeking servo for moving said frame parallel to said X-axis;
   a tracking servo for moving said lens assembly relative to said frame to move said objective lens parallel to said X-axis;
   a focusing servo for moving said lens assembly relative to said frame to move said objective lens parallel to said Z-axis; and
   an optoelectronic sensor for generating a first output signal representing a position of said objective lens relative to said frame on said X-axis, said optoelectronic sensor including a sensor module and a reflector, said sensor module being mounted in said lens assembly and including a single light source and a quadrant photodetector, said reflector, mounted on said frame, for astigmatically reflecting light emitted from said light source to said quadrant photodetector., and said reflector including a concave mirror having different radii of curvature in different directions.

10. A lens actuating system for an optical read and/or write apparatus that uses a light beam to read information from and/or write information to tracks on an optical recording medium, comprising:
   a frame having a Z-axis perpendicular to a surface of the optical recording medium and an X-axis perpendicular to said Z-axis and perpendicular to said tracks;
   a lens assembly, movably mounted on said frame, having an objective lens for focusing said light beam onto said optical recording medium;
   a seeking servo for moving said frame parallel to said X-axis;
   a tracking servo for moving said lens assembly relative to said frame to move said objective lens parallel to said X-axis;
   a focusing servo for moving said lens assembly relative to said frame to move said objective lens parallel to said Z-axis; and
   an optoelectronic sensor for generating a first output signal representing a position of said objective lens relative to said frame on said X-axis, said optoelectronic sensor including a sensor module and a reflector, said sensor module being mounted in said lens assembly and including a single light source and a quadrant photodetector, said reflector, mounted on said frame, for astigmatically reflecting light emitted from said light source to said quadrant photodetector, and wherein said reflector is a holographic reflector.

11. A lens actuating system for an optical read and/or write apparatus that uses a light beam to read information from and/or write information to tracks on an optical recording medium, comprising:
   a frame having a Z-axis perpendicular to a surface of the optical recording medium and an X-axis perpendicular to said Z-axis and perpendicular to said tracks;
   a lens assembly, movably mounted on said frame, having an objective lens for focusing said light beam onto said optical recording medium;
   a seeking servo for moving said frame parallel to said X-axis;
   a tracking servo for moving said lens assembly relative to said frame to move said objective lens parallel to said X-axis;
   a focusing servo for moving said lens assembly relative to said frame to move said objective lens parallel to said Z-axis;
   an optoelectronic sensor for generating a first output signal representing a position of said objective lens relative to said frame on said X-axis, said optoelectronic sensor including a sensor module and a reflector, said sensor module being mounted on said frame and including a single light source and a quadrant photodetector, said reflector, mounted in said lens assembly, for reflecting light emitted from said light source to said quadrant photodetector, and said reflector comprises a concave mirror having different radii or curvature in different directions.

12. A lens actuating system for an optical read and/or write apparatus that uses a light beam to read information from and/or write information to tracks on an optical recording medium, comprising:
   a frame having a Z-axis perpendicular to a surface of the optical recording medium and an X-axis perpendicular to said Z-axis and perpendicular to said tracks;
   a lens assembly, movably mounted on said frame, having an objective lens for focusing said light beam onto said optical recording medium;
   a seeking servo for moving said frame parallel to said X-axis;
   a tracking servo for moving said lens assembly relative to said frame to move said objective lens parallel to said X-axis;
   a focusing servo for moving said lens assembly relative to said frame to move said objective lens parallel to said Z-axis;
   an optoelectronic sensor for generating a first output signal representing a position of said objective lens relative to said frame on said X-axis, said optoelectronic sensor including a sensor module and a reflector, said sensor module being mounted on said frame and including a single light source and a quadrant photodetector, said reflector, mounted in said lens assembly, for reflecting light emitted from said light source to said quadrant photodetector, and wherein said reflector is a holographic reflector.

* * * * *